(12) United States Patent
Matsuyama et al.

(10) Patent No.: US 7,062,471 B1
(45) Date of Patent: Jun. 13, 2006

(54) ELECTRONIC RIGHTS INFORMATION PROCESSING SYSTEM, METHOD AND APPARATUS FOR CARRYING OUT SAME AND RECORDED MEDIUM FOR PROGRAM CARRYING OUT THE METHOD

(75) Inventors: Kazuo Matsuyama, Yokohama (JP); Ko Fujimura, Yokohama (JP); Yoshihito Oshima, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 67 days.

(21) Appl. No.: 09/588,350

(22) Filed: Jun. 7, 2000

(30) Foreign Application Priority Data

Jun. 7, 1999 (JP) ................................ 11-159596

(51) Int. Cl.
*G06F 17/00* (2006.01)
(52) U.S. Cl. ........................... 705/65; 705/64; 713/156
(58) Field of Classification Search .................. 705/13, 705/26, 27, 37, 65, 64, 67; 713/200, 201, 713/156, 173, 175, 157
See application file for complete search history.

(56) References Cited

U.S. PATENT DOCUMENTS 6,182,131 B1 * 1/2001 Dean et al. ................. 709/222
6,209,095 B1 * 3/2001 Anderson et al. ........... 713/176
6,240,396 B1 * 5/2001 Walker et al. ................ 705/26
6,322,446 B1 * 11/2001 Yacenda ....................... 463/16

FOREIGN PATENT DOCUMENTS

JP 411213104 A * 8/1999

* cited by examiner

*Primary Examiner*—Elisca Pierre Eddy
(74) *Attorney, Agent, or Firm*—Connolly Bove Lodge & Hutz LLP

(57) ABSTRACT

A transferer terminal accesses its account (of the transferer) to receive a list of electronic tickets contained in his account, selects a ticket which is to be transferred, transmits that electronic ticket, an account address of a transferee and a demand for transfer to the account, which in turn accesses an account of a transferee to receive an account addreess certificate, which is then verified by a terminal. A result of verification is transmitted to the account of transferer, whereby the electronic ticket is transmitted from the account of the transferer to the account the transferee. The account of the transferee verifies the received electronic ticket, and upon successful verification, it transmits such result to the account of the transferer, which then demands a certificate of transfer with signature from the transferer terminal. The transferer terminal demands a signature to be attached to the certificate of transfer from a portable processor. The certificate of transfer with signature which is thus obtained is then transmitted to the account of the transferer, which then transmits it to the account of the transferee. The account of the transferee retains the received certificate of transfer with signature together with the electronic ticket.

3 Claims, 26 Drawing Sheets

FIG. 5

60A ELECTRONIC TICKET

| | ATTRIBUTE | VALUE(EXAMPLE) | |
|---|---|---|---|
| | SCHEMA ID | http://digitalticket.net/concert | 601 |
| | TICKET ID | 000234 | 602 |
| | ISSUER ID | Daspw6Oms21wmfsd3 | 603 |
| | VARIETY OF RIGHTS | CONCERT TICKET | 604 |
| | RIGHTS INFORMATION | ARTIST=ab-strom<br>DATE=2000-03-01 | 610 |
| ISSUING CONDITIONS (620) | TRANSMITTER DEMAND TICKET SCHEMA ID | http://digitalticket.net/issure-cert | 621 |
| | RECEIVER DEMAND TICKET SCHEMA ID | http://digitalticket.net/user-reg-cert | 622 |
| TRANSFER CONDITIONS (630) | TRANSFERABILITY | TRANSFERABLE | 631 |
| | TRANSMITTER DEMAND TICKET SCHEMA ID | http://digitalticket.net/user-reg-cert | 632 |
| | RECEIVER DEMAND TICKET SCHEMA ID | http://digitalticket.net/user-reg-cert | 633 |
| CONSUMPTION CONDITIONS (640) | EFFECTIVE TIME LIMIT | 2000-03-01 | 641 |
| | EFFECTIVE NUMBER OF TIMES | ONCE | 642 |
| | TRANSMITTER DEMAND TICKET SCHEMA ID | http://digitalticket.net/user-reg-cert | 643 |
| | RECEIVER DEMAND TICKET SCHEMA ID | http://digitalticket.net/examine-cert | 644 |
| | OWNER ID | E2W4usdhale05j4x92kld984 | 605 |
| | ISSUER SIGNATUER | Eplx3c012k0dlc8765jsp23d41d | 606 |

FIG. 6

60B CERTIFICATE OF TRANSFER

| ATTRIBUTE | VALUE(EXAMPLE) | |
|---|---|---|
| SCHEMA ID | #sys-transferred-cert | 601 |
| TICKET ID | 000132349 | 602 |
| CURRENT OWNER ID | E2W4usdhale05j4x92kld984 | 603 |
| VARIETY OF RIGHTS | CERTIFICATE OF TRANSFER | 604 |
| RIGHTS INFORMATION | TRANSFER TICKET SCHEMA ID= http://digitalticket.net/concert TRANSFER TICKET ID=000234 DATE OF ISSUE=2000-02-28 | 610 |
| ISSUING CONDITIONS — TRANSMITTER DEMAND TICKET SCHEMA ID | | 621 |
| ISSUING CONDITIONS — RECEIVER DEMAND TICKET SCHEMA ID | | 622 |
| TRANSFER CONDITIONS — TRANSFERABILITY | NON-TRANSFERABLE | 631 |
| TRANSFER CONDITIONS — TRANSMITTER DEMAND TICKET SCHEMA ID | | 632 |
| TRANSFER CONDITIONS — RECEIVER DEMAND TICKET SCHEMA ID | | 633 |
| CONSUMPTION CONDITIONS — EFFECTIVE TIME LIMIT | | 641 |
| CONSUMPTION CONDITIONS — EFFECTIVE NUMBER OF TIMES | | 642 |
| CONSUMPTION CONDITIONS — TRANSMITTER DEMAND TICKET SCHEMA ID | | 643 |
| CONSUMPTION CONDITIONS — RECEIVER DEMAND TICKET SCHEMA ID | | 644 |
| NEW OWNER ID | Fdfsdlp94if87i3kjdf83oqfstew | 605 |
| ISSUER SIGNATUER | Dsknei5498f3kxk03cdscjsurw | 606 |

620 ISSUING CONDITIONS
630 TRANSFER CONDITIONS
640 CONSUMPTION CONDITIONS

FIG. 7

60C CERTIFICATE OF CONSUMPTION

| ATTRIBUTE | | VALUE(EXAMPLE) | |
|---|---|---|---|
| SCHEMA ID | | # sys-consumed-cert | 601 |
| TICKET ID | | 004239 | 602 |
| ISSUER ID | | Fdfsdlp94if87i3kjdf83oqfstew | 603 |
| VARIETY OF RIGHTS | | CERTIFICATE OF CONSUMPTION | 604 |
| RIGHTS INFORMATION | | CONSUMPTION TICKET SCHEMA ID= http://digitalticket.net/concert CONSUMPTION TICKET ID=000234 DATE OF ISSUE=2000-03-14 | 610 |
| ISSUING CONDITIONS (620) | TRANSMITTER DEMAND TICKET SCHEMA ID | | 621 |
| | RECEIVER DEMAND TICKET SCHEMA ID | | 622 |
| TRANSFER CONDITIONS (630) | TRANSFERABILITY | NON-TRANSFERABLE | 631 |
| | TRANSMITTER DEMAND TICKET SCHEMA ID | | 632 |
| | RECEIVER DEMAND TICKET SCHEMA ID | | 633 |
| CONSUMPTION CONDITIONS (640) | EFFECTIVE TIME LIMIT | | 641 |
| | EFFECTIVE NUMBER OF TIMES | | 642 |
| | TRANSMITTER DEMAND TICKET SCHEMA ID | | 643 |
| | RECEIVER DEMAND TICKET SCHEMA ID | | 644 |
| OWNER ID | | | 605 |
| ISSUER SIGNATUER | | Csknei5498f3kxk03cdscjsurw | 606 |

FIG. 8A

60B CERTIFICATE OF TRANSFER

| TICKET INFORMATION | OWNER ID (NEW OWNER) | ISSUER SIGNATURE(SIGNATURE OF CURRENT OWNER) |
|---|---|---|
| 60B1 | 60B2 | 60B3 |

FIG. 8B

60C CERTIFICATE OF CONSUMPTION

| TICKET INFORMATION | NULL | ISSUER SIGNATURE(SIGNATURE OF CURRENT OWNER) |
|---|---|---|
| 60C1 | 60C2 | 60C3 |

FIG. 9

60D CERTIFICATE OF USER INSCRIPTION

| | ATTRIBUTE | VALUE(EXAMPLE) | |
|---|---|---|---|
| | SCHEMA ID | http://digitalticket.net/user-reg-cert | 601 |
| | TICKET ID | 00023323 | 602 |
| | ISSUER ID | Hduebx94hf75nsghct3kd9j | 603 |
| | VARIETY OF RIGHTS | CERTIFICATE OF USER INSCRIPTION | 604 |
| | RIGHTS INFORMATION | PUBLIC KEY OF USER owjidhf123u8n9nz98bwqjaolkanda | 610 |
| 620 ISSUING CONDITIONS | TRANSMITTER DEMAND TICKET SCHEMA ID | | 621 |
| | RECEIVER DEMAND TICKET SCHEMA ID | | 622 |
| 630 TRANSFER CONDITIONS | TRANSFERABILITY | NON-TRANSFERABLE | 631 |
| | TRANSMITTER DEMAND TICKET SCHEMA ID | | 632 |
| | RECEIVER DEMAND TICKET SCHEMA ID | | 633 |
| 640 CONSUMPTION CONDITIONS | EFFECTIVE TIME LIMIT | 2001-03-01 | 641 |
| | EFFECTIVE NUMBER OF TIMES | | 642 |
| | TRANSMITTER DEMAND TICKET SCHEMA ID | | 643 |
| | RECEIVER DEMAND TICKET SCHEMA ID | | 644 |
| | OWNER ID | Kjsas0k2r2sd904jfslkvdfmso | 605 |
| | ISSUER SIGNATUER | Fjsuiwhe7vfjle9jkdfuio9034j | 606 |

FIG. 10

60E CERTIFICATE OF TICKET EXAMINER INSCRIPTION

| ATTRIBUTE | | VALUE(EXAMPLE) | |
|---|---|---|---|
| SCHEMA ID | | http://digitalticket.net/user-reg-cert | 601 |
| TICKET ID | | 00023323 | 602 |
| ISSUER ID | | Hduebx94hf75nsghct3kd9j | 603 |
| VARIETY OF RIGHTS | | CERTIFICATE OF TICKET EXAMINER INSCRIPTION | 604 |
| RIGHTS INFORMATION | | PUBLIC KEY OF TICKET EXAMINER 45IsJiQ34I9odr40KZsmJnqtMLUaH7 | 610 |
| ISSUING CONDITIONS | TRANSMITTER DEMAND TICKET SCHEMA ID | | 621 |
| | RECEIVER DEMAND TICKET SCHEMA ID | | 622 |
| TRANSFER CONDITIONS | TRANSFERABILITY | NON-TRANSFERABLE | 631 |
| | TRANSMITTER DEMAND TICKET SCHEMA ID | | 632 |
| | RECEIVER DEMAND TICKET SCHEMA ID | | 633 |
| CONSUMPTION CONDITIONS | EFFECTIVE TIME LIMIT | 2001-03-01 | 641 |
| | EFFECTIVE NUMBER OF TIMES | | 642 |
| | TRANSMITTER DEMAND TICKET SCHEMA ID | | 643 |
| | RECEIVER DEMAND TICKET SCHEMA ID | | 644 |
| OWNER ID | | Kjsas0k2r2sd904jfslkvdfmso | 605 |
| ISSUER SIGNATUER | | Fjsuiwhe7vfjle9jkdfuio9034j | 606 |

60F CERTIFICATE OF ACCOUNT ADDRESS

| ATTRIBUTE | | VALUE(EXAMPLE) | |
|---|---|---|---|
| SCHEMA ID | | http://digitalticket.net/address-cert | 601 |
| TICKET ID | | 00023323 | 602 |
| ISSUER ID | | lujjnvhirj9467flmvjgdokd9472pfks | 603 |
| VARIETY OF RIGHTS | | CERTIFICATE OF ACCOUNT ADDRESS | 604 |
| RIGHTS INFORMATION | | account://ticket.matsuyama.net/ | 610 |
| ISSUING CONDITIONS (620) | TRANSMITTER DEMAND TICKET SCHEMA ID | | 621 |
| | RECEIVER DEMAND TICKET SCHEMA ID | | 622 |
| TRANSFER CONDITIONS (630) | TRANSFERABILITY | NON-TRANSFERABLE | 631 |
| | TRANSMITTER DEMAND TICKET SCHEMA ID | | 632 |
| | RECEIVER DEMAND TICKET SCHEMA ID | | 633 |
| CONSUMPTION CONDITIONS (640) | EFFECTIVE TIME LIMIT | 2001-03-01 | 641 |
| | EFFECTIVE NUMBER OF TIMES | | 642 |
| | TRANSMITTER DEMAND TICKET SCHEMA ID | | 643 |
| | RECEIVER DEMAND TICKET SCHEMA ID | | 644 |
| OWNER ID | | Kjsas0k2r2sd904jfslkvdfmso | 605 |
| ISSUER SIGNATUER | | J397eopcjos22fsffspda467fjh | 606 | though.

ELECTRONIC RIGHTS INFORMATION PROCESSING SYSTEM, METHOD AND APPARATUS FOR CARRYING OUT SAME AND RECORDED MEDIUM FOR PROGRAM CARRYING OUT THE METHOD

BACKGROUND OF THE INVENTION

The invention relates to a treatment such as circulation of information corresponding to that which concerns the rights relating to a commercial trade or electronic information which signifies a variety of rights (hereafter referred to as electronic rights information or electronic ticket), and in particular, to a method of and an apparatus for treatment of electronic rights information which safeguard the rights information against copying or falsification while allowing a safe storage and circulation thereof, and a recorded medium having a program recorded therein which is used to carry out the method.

Recently, attempts are in progress which are intended to provide an electronization or digitalization of rights information as contained in cash or tickets. Currently, such rights information is generally stored in a portable medium such as an IC card or a magnetic card or managed in a concentrated manner by an issuer of rights information in the form of accounts located in a center database.

A system storing rights information in accounts managed by the issuer is exemplified by "e-Ticket" from "digitimini" company. In this system, an IC card which verifies the identity of a user is handed to the user upon subscription. A ticket can be reserved through Web page, and reservation information is recorded in a database maintained by the e-Ticket. The user shows his IC card when entering an auditorium, whereby a confirmation can be made if the user has previously made a reservation. Since the IC card has no storage of reservation information, this system is characterized by the absence of any limit on the data capacity.

On the other hand, a system in which rights information is stored in a portable medium is exemplified by an electronic cash system by MONDEX. In this system, electronic data which is equivalent to an amount of cash is stored in a card, which is physically carried by a user. A payment in a store can be completed by transferring the cash data stored in the card to a card of the store. This system is characterized by its ability to allow an off-line transfer of cash data without utilizing a network.

Japanese Patent Publication No. 27,815/1996 proposes an electronic asset data transfer method using a plurality of portable data carriers in which a trading is enabled by transferring electronic cash data or frequency data such as a service utilization privilege from a user's account or the like. According to this method, electronic asset data is normally stored in the account, and thus the method is characterized by being utilized by allowing a transfer as required to a portable terminal unit which is convenient to use and which assures a high security.

A system such as the e-Ticket in which the issuer manages the account has a problem, in the first instance, that it is susceptible to falsification or deletion of the electronic rights information by the issuer. This does not present any significant problem if the issuer can be trustworthy as for instance of flight tickets issued by airlines. But where the issuer is not trustworthy as in an instance of a personally issued bond, it is of primary importance to determine who manages the rights information.

In the second instance, for the management of the account by the issuer, a network connection with the database of the issuer or the manager organization thereof is an essential requirement, and an issuance, a transfer, a ticket examination or the like is inhibited in an environment which makes such network connection unavailable.

In the third instance, for the account management by the issuer, there is a problem that the management only covers those rights information issued by the issuer as a matter of course, and the storage of other rights information is generally unavailable. A vicarious agency may issue and manage any other desired rights information without accompanying any significant technical difficulty, but its operation becomes complicated owing to the needs for a deed of contract which must be concluded between a client which desires the issuance of rights information and the vicarious agency and a payment of fees associated therewith.

On the other hand, the system in which rights information is stored in a portable medium suffers from the problems as mentioned below. In the first instance, when issuing rights information or transferring it through a network, it is always necessary to have two portable media connected together to the network. An access is allowed at any time for the approach storing rights in the account, while because the portable medium is physically carried by an individual, the system of this type is subject to the fact that time when the portable medium of the other party is connected to the network is greatly limited. Accordingly, upon issuing or transferring rights information, both cards must be simultaneously put into terminals to make them in condition for use, as by communicating to each other. Accordingly, it is difficult to apply this approach for instances of use such as coupons or gift certificates which are unilaterally afforded from a transferer independently from the convenience and intent of a transferee.

In the second instance, an IC has a greatly limited capacity under the current state of the art, and accordingly, the amount of electronic rights information which can be stored is limited.

It is to be noted that in the disclosure of Japanese Patent Publication No. 27,815/1996, the electronic asset data is transferred as required from the account to a portable medium to enable a transaction, thus enabling some of the problems mentioned above to be overcome. However, it is premised that the issuer of the electronic asset data remains to be only the bank which manages the account, and thus there cannot be provided an account where a variety of rights information issued by a number of issuers can be managed. There also remains a problem that it is difficult to control a range of circulation which varies from one rights variety to another and a verification of qualification of a ticket examiner.

SUMMARY OF THE INVENTION

It is an object of the invention to provide an electronic rights information processing system which is capable of managing a variety of electronic tickets in the form of transferable and consumable rights information in large quantities and enabling a transfer and/or consumption thereof, a method and an apparatus for carrying out same, and a recorded medium having a program which is used to carry out the method recorded thereon.

It is another object of the invention to provide an electronic rights information processing system which enables a unilateral transfer of an electronic rights information without mutual communication with a transferee, a method of and an apparatus for carrying out same, and a recorded medium having a program which is used to carry out the method recorded thereon.

It is a further object of the invention to provide an electronic rights information processing system which reveals any illicit use of an illicitly obtained electronic rights information, a method of and an apparatus for carrying out same, and a recorded medium having a program which is used to carry out the method recorded thereon.

A method according to the invention comprises:

introducing an account unit which is managed by a user or a third party organization which is designated by the user rather than by an issuer unit, when electronic rights information is to be issued by an issuer unit, transmitting an account address and a demand for issuance from a user terminal unit to the issuer unit;

connecting the issuer unit with an account unit corresponding to the account address;

obtaining a user identifier of the user terminal unit from the account unit;

preparing electronic rights information inclusive of the user identifier;

transmitting the electronic rights information to the account unit;

and the account unit storing the electronic rights information in storage means.

Upon receipt of the demand for issuance, the issuer unit accesses the account address of the user;

the accessed account unit transmits an account address certificate to the issuer unit, the account address certificate guaranteeing a correspondence relationship between the account address assigned to the user and the identifier of an owner of the account unit;

the issuer unit verifies the account address certificate, and upon successful verification, treats the owner identifier contained in the address certificate as the user identifier;

and stores the received electronic rights information in the storage means.

A method of consuming electronic rights information comprises:

deriving an account address from a portable processor and transmitting it to a ticket examiner unit;

connecting the ticket examiner unit with an account unit at the account address to demand required electronic rights information;

causing the account unit to derive the demanded electronic rights information and to transmit to the ticket examiner unit;

and the ticket examiner unit verifying the electronic rights information and rendering a decision to enable or disable a ticket examination.

The ticket examiner unit demands the portable processor to generate a signature to a certificate of consumption and verifies a certificate of consumption with signature.

BRIEF DESCRIPTION OF THE DRAWINGS

FIG. 5 is an illustration of an electronic ticket;

FIG. 6 is an illustration of a transfer certificate;

FIG. 7 is an illustration of a consumption certificate;

FIG. 8A is a view showing an example of a simplified transfer certificate;

FIG. 8B is a view showing an example of a simplified consumption certificate;

FIG. 9 is a view showing an example of a certificate of user inscription;

FIG. 10 is a view showing an example of a certificate of certificate of inscription;

FIG. 11 is a view showing an exemplary certificate of account address;

DETAILED DESCRIPTION OF PREFERRED EMBODIMENTS

Several embodiments of the present invention will now be described with reference to the drawings.

Block Arrangement

Figure 1:
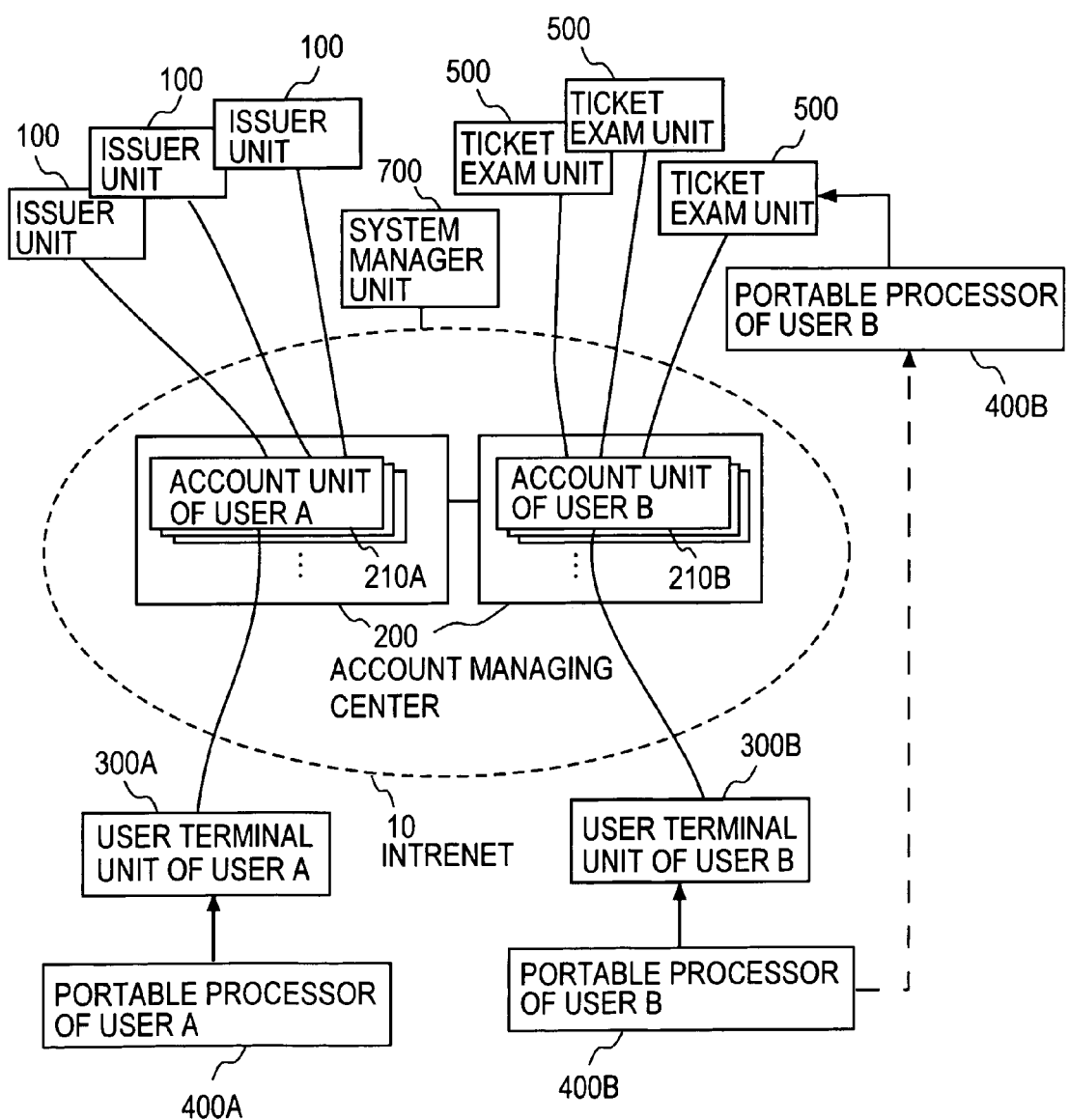
FIG. 1 is a block diagram showing an exemplary arrangement of an electronic ticket system.

FIG. 1 is a block diagram of an electronic ticket system which incorporates an account unit according to one embodiment of the invention. As shown in FIG. 1, the system comprises a plurality of issuer units 100 connected to a communication network 10 such as an internet, for example, an account unit managing center 200 covering a plurality of account units, user terminal units 300A, 300B, . . . (any one being denoted by 300), a plurality of ticket examiner units 500, a system manager center 700 and portable processors 400A, 400B, . . . (any one being denoted by 400) such as an IC card or the like which can be loaded into the user terminal unit 300 and the ticket examiner units 500 acting as a terminal unit.

The account managing center 200 includes a number of account units 210, each of which is assigned a globally unique account address as an account number. In the electronic ticket system according to the present invention, the account managing center 200 is provided independently from an organization which issues an electronic ticket.

Figure 2A:
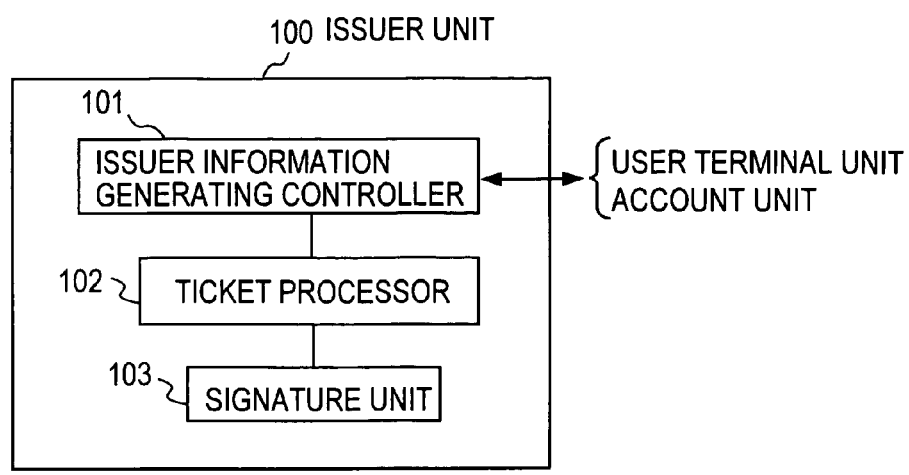
FIG. 2A is a block diagram showing an exemplary functional arrangement of an issuer unit.

Issuer Unit 100:

Each issuer unit 100 represents means which is used by various organizations to issue respective rights information in the form of an electronic ticket, and as shown in FIG. 2A, it comprises an issued information generation controller 101, an electronic ticket processor (issuing section) 102 and a signature unit 103.

Account Managing Center 200:

The account managing center 200 is always open on a network, and a user can deposit a variety of electronic tickets which the user has obtained into an account address assigned to the user as a result of the electronic ticket system utilization contract, so that the electronic tickets can be saved in that account or any intended one of the electronic tickets saved in the account can be withdrawn for use (or consumption). An electronic ticket may be transferred into the account by the issuer unit in response to a demand for issuance of an electronic ticket delivered thereto, or another entity (individual, organization, corporation) may pay an electronic ticket such as a gift card, coupon or the like into the account address independently from the intent of a user of the account. In this manner, the transfer into each account does not require a key of the recipient, and anybody who knows the account number can transfer an electronic ticket into it. However, the transfer to another and/or consumption of an electronic ticket which is stored at the account address is allowed only when the owner of the account has loaded his portable processor 400 into the user terminal unit 300 or the ticket examiner units 500.

Figure 2B:
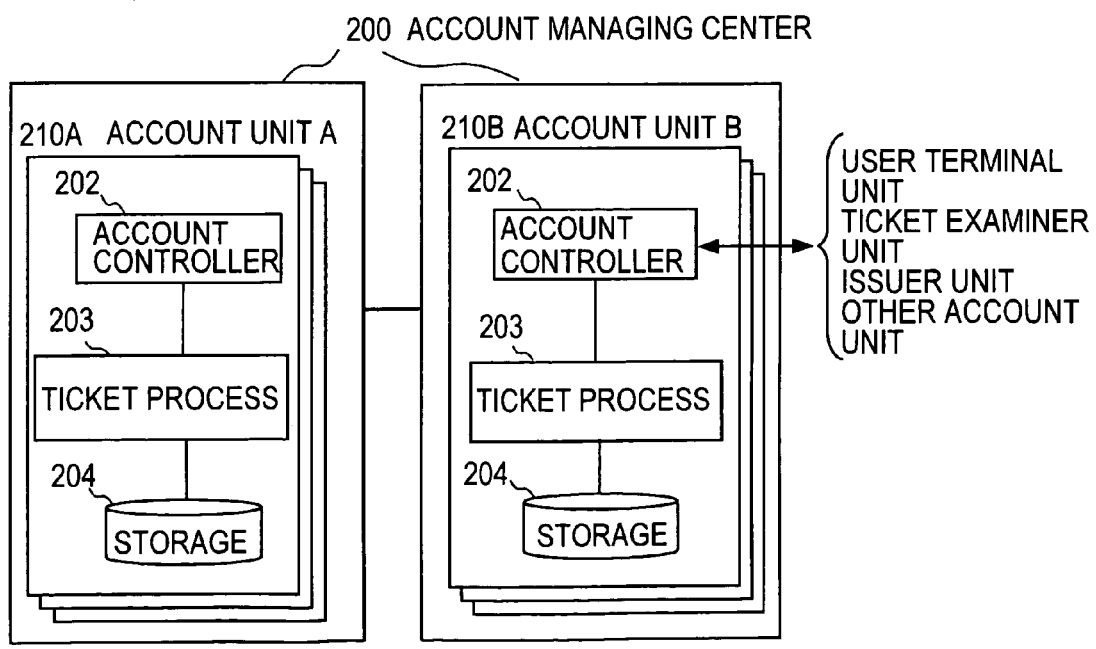
FIG. 2B is a block diagram showing an exemplary functional arrangement of an account unit.
Figure 3A:
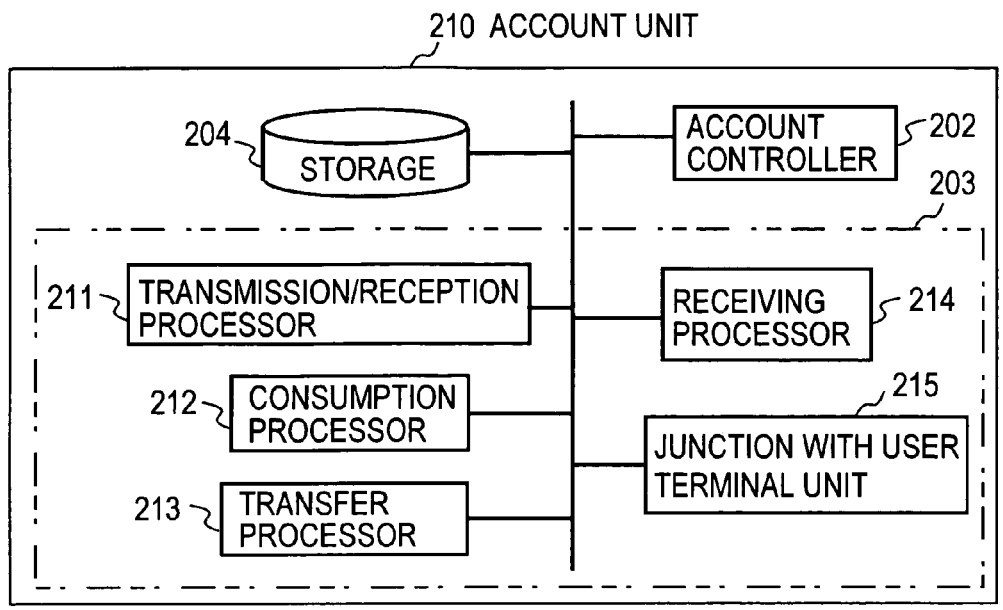
FIG. 3A is a view showing a more detailed functional arrangement of the account unit.

The account managing center 200 is an organization which is independent from an electronic ticket issuing organization, and comprises a plurality of account units 210A, 210B, . . . (any one being denoted by 210), as shown in FIG. 2B. A user who intends to utilize a service offered by the electronic ticket system is given an account address. A corresponding account unit 210 saves and manages the electronic ticket of the user. Each account unit 210 manages a single account, and comprises an account controller 202, an electronic ticket processor 203 and a storage 204. More specifically, in addition to the account controller 202 and the storage 204, the account unit 210 comprises a transmitter/receiver 211, a consumption processor 212, a transferee processor 213, a transferee processor 214, and a junction 215 for connection with a user terminal unit, all of which constitute together the electronic ticket processor 203, as shown in FIG. 3A. Each storage 204 may utilize a memory such as a high capacity hard disc, which affords a sufficiently high capacity for a user to utilize it in order to save the electronic tickets.

Figure 3B:
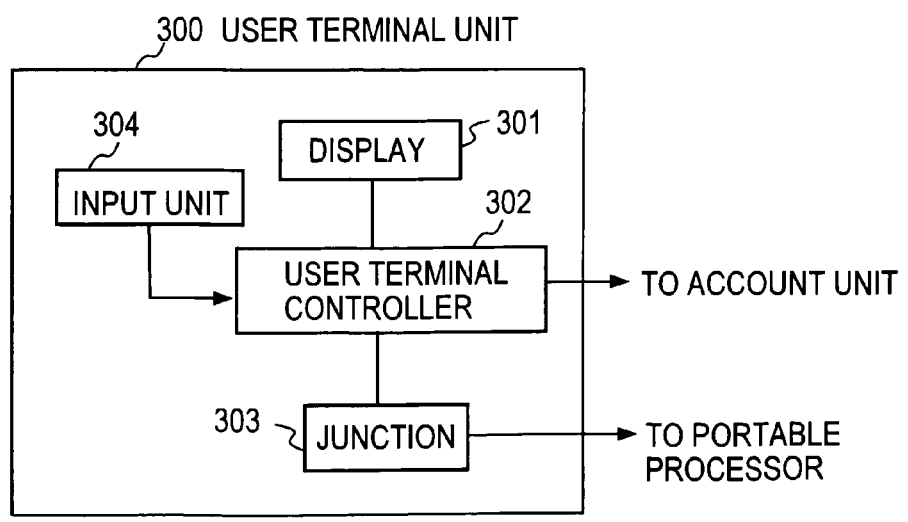
FIG. 3B is a block diagram showing an exemplary functional arrangement of a user terminal unit.

User Terminal Unit 300:

User terminal unit 300 represents means by which a user can retrieve, purchase or transfer an electronic ticket on a net, and is implemented in a PC located at a user's home PDA, portable phone or a KIOSK terminal which is installed in a ticket bureau where a variety of electronic tickets are sold, a gift coupon/merchandise coupon sales room of a department store or the like, and comprises a display 301, a user terminal controller (a junction with the account unit) 302, a junction 303 with a portable processor such as an IC card reader/writer or the like, and an input unit 304, as shown in FIG. 3B.

Figure 4A:
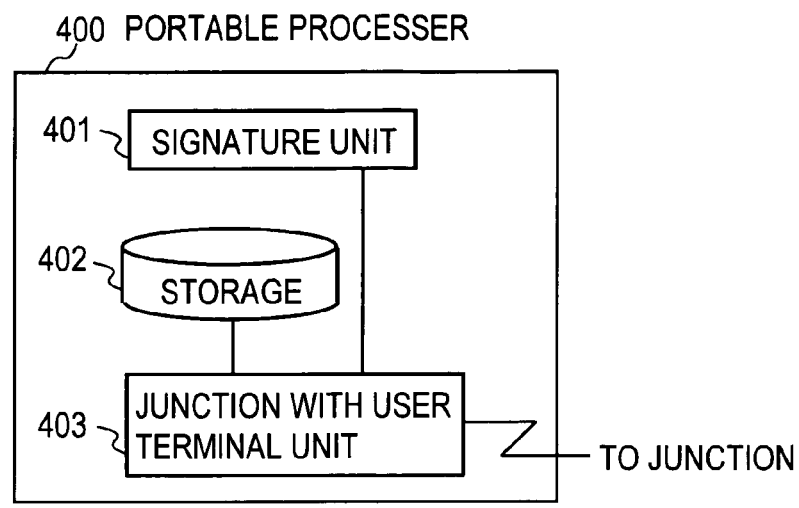
FIG. 4A a block diagram showing an exemplary functional arrangement of a portable processor.

Portable Processor 400:

The portable processor 400 such as an IC card or the like represents means which a user utilizes when using (transferring or consuming) an electronic ticket by inserting it into the user terminal unit 300 or the ticket examiner unit 500, and comprises a signature unit 401 which is used to produce a signature attached to a certificate of transfer or a certificate of consumption during a transfer or consumption of an electronic ticket, a storage 402 for storing a user identification information user ID and an account address of a user, and a junction 403 with the user terminal unit, as shown in FIG. 4A. It is to be noted that the portable processor 400 itself does not contain an electronic ticket body, but retains the function of accessing an account unit in which an electronic ticket specified by the account address is saved. It is to be noted that in the description to follow, where a reference to "a certificate of transfer" or "a certificate of consumption" is simply made, this means an unsigned certificate of transfer or consumption, and any such certificate which is signed or attached with a signature will be referred to as "a certificate of transfer with signature" or "a certificate of consumption with signature".

The certificate of transfer and the certificate of consumption are not always required to implement the present invention, but in embodiments to be described later in which these certificates are used, it is required in either the transfer or the consumption of the electronic ticket that (a) a user attaches his signature to the certificate of transfer or consumption with the signature unit 401 of the portable processor 400, and hands it to the transferee or the ticket examiner together with the electronic ticket. The signature is made with a secret key, which is produced in a pair with an public key, for example, and the public key may be used to verify the validity of the signature;

(b) when transferring or consuming the electronic ticket, the electronic ticket can be transferred with all past certificates of transfer and/or consumption with signature which have been attached to the electronic ticket as an attachment to the electronic ticket, thus allowing a profiteer to be pursued in the event of an illicit use.

In this embodiment, no key is provided in the account of the user, and thus it is possible to present a certificate of the account address from the account unit of another person. This allows usurpation of the electronic ticket by successfully impersonating oneself with the account address of another person. However, when using (transferring or consuming) the electronic ticket which is illicitly usurped, it is impossible to attach a signature which corresponds to the authentic user ID because of a lack of knowledge of the secret key of the authentic user. In other words, the electronic ticket cannot be used.

Since the owner ID 605 of the certificate of transfer 60B prepared by the transferer should be the user ID of the proper transferee, it is impossible to attach the signature of the authentic transferee to the certificate of transfer or consumption which is prepared by the illicit acquirer when using the electronic ticket which is illicit acquired. If the signature of the illicit acquirer himself is attached, this signature cannot be verified with the public key of the authentic transferee, whereby the injustice will be revealed.

If the illicit acquirer of the electronic ticket makes a signature to the certificate of transfer or consumption using his own portable processor on the basis of the account address and a user ID of himself, rather than attaching the certificate of transfer or consumption which has originally been attached to the electronic ticket, the continuity of transition of owners which are stated on the series of certificates of transfer and/or consumption with signature which are attached to the electronic ticket will be lost, thus allowing an ex post facto reveal. Accordingly, the electronic ticket processing system according to the present invention is characterized in that an illicit acquisition of the electronic ticket using certificate of account address of another person does not present any significant problem whatsoever.

Figure 4B:
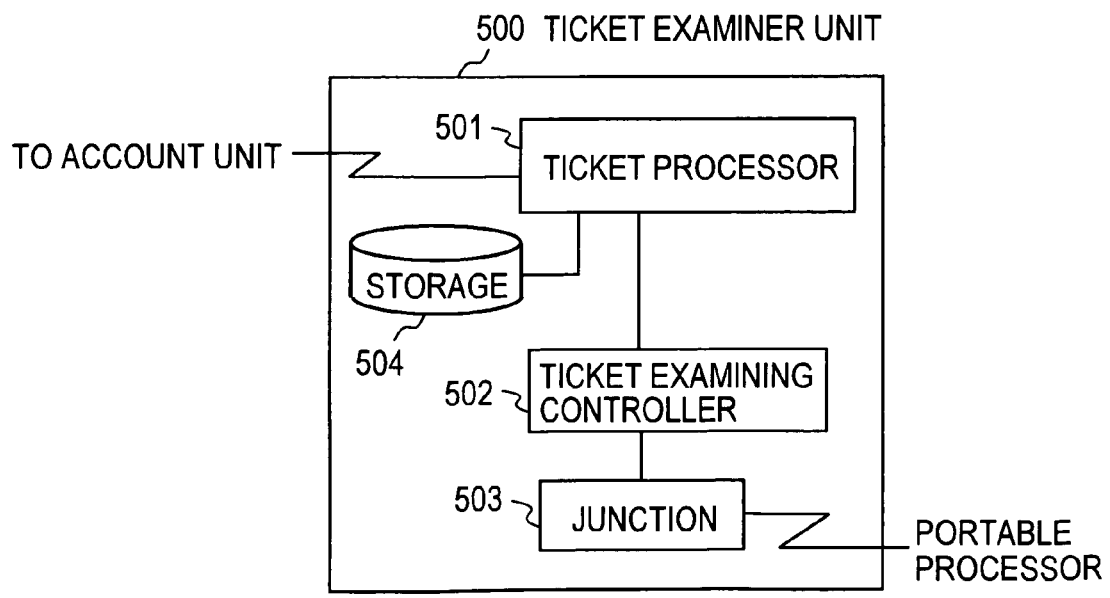
FIG. 4B a block diagram showing an exemplary functional arrangement of a ticket examiner unit.

Ticket Examiner Units 500:

Each ticket examiner units 500 is installed at a number of locations where the use of an electronic ticket is accepted such as a hotel, a concert hall, an airport counter or the like, for example, for examining (consuming) a single variety or a plurality of varieties of electronic tickets. The ticket examiner units 500 establishes a connection with the user account unit to enable a necessary processing to be conducted whenever the portable processor 400 of the user is loaded therein, and is similar to the user terminal unit in this respect and may be considered as a kind of terminal unit. As shown in FIG. 4B, each ticket examiner units 500 comprises an electronic ticket processor 501, a ticket examination controller 502, a junction 503 with a portable processor such as an IC card reader/writer or the like and a storage 504. Any electronic ticket which is consumed in the ticket examiner units 500 is temporarily stored in the storage 504 of the ticket examiner units 500 together with the attached certificate of transfer with signature and with a certificate of consumption with signature which is prepared as a result of the consumption treatment, or is immediately transmitted to the system manager center 700.

System Manager Center 700:

The system manager center 700 verifies the continuity of owners by utilizing electronic tickets, attached certificates of consumption with signature and/or any certificates of transfer with signature which are returned, and pursues a profiteer if any illicit use is found.

Any kind of electronic rights information such as an electronic ticket, a certificate of transfer, a certificate of consumption, a certificate of user inscription, a certificate of ticket examiner inscription, a certificate of account address and the like which is always used or used as required in the electronic ticket processing system according to the present embodiment to be described herebelow is represented all fundamentally in the similar format, and therefor an applicable description will not be repeatedly given. It should be understood that such rights information may also be represented in respective unique format.

Electronic Ticket

An electronic ticket is a representation of the right to claim a service or an article in the form of a digital information, and the electronic ticket as termed in the present invention signifies any rights information including a coupon, a beer coupon, a merchandise coupon, a gift coupon, a point card, a subscription coupon, a lagnappe coupon, a sample coupon, a purchased goods receipt, an entrance ticket, a concert ticket, a flight ticket, a lodging coupon, a meal coupon, a coupon ticket, a bill of lading, a stock certificate, an option certificate or the like.

FIG. 5 shows a concert ticket as an example of an electronic ticket 60A.

As shown in FIG. 5, a single electronic ticket 60A comprises a ticket schema ID 601, a ticket ID 602, an issuer ID 603, a variety of rights 604, a rights information 610, an issuance condition 620, a transfer condition 630, a consumption condition 640, an owner ID 605 and an issuer signature 606.

The ticket schema ID 601 is a globally unique identifier which represents a variety of the ticket. The ticket ID 602 is a globally unique identifier which is assigned to each ticket. The issuer ID 603 represents a globally unique identifier which is assigned to each issuer. The variety of rights 604 indicates the title of the right signified by the electronic ticket. The rights information 610 represents the content of the right guaranteed by the electronic ticket, and has a structure which differs from ticket schema to ticket schema. For example, the concert ticket shown in FIG. 5 comprises the name of an artist and the day of the concert.

The issuance condition 620 comprises a transmitter demand ticket schema ID 621 and a receiver demand ticket schema ID 622, and indicates conditions which are demanded upon issuance treatment. The transfer condition 630 comprises a transferability 631, a transmitter demand ticket schema ID 632, and a receiver demand ticket schema ID 633, indicating the transferability and conditions which are required for the transfer treatment. The consumption condition 640 comprises an effective period 641, an effective number of times 642, a transmitter demand ticket schema ID 643, and a receiver demand ticket schema ID 644, indicating conditions which are required for the consumption treatment. The transmitter demand ticket schema ID which is stated in each of the issuance condition 620, the transfer condition 630 and the consumption condition 640 refers to an electronic ticket (hereafter referred to as certificate of inscription) which must be retained by a transmitting device when the ticket is put in circulation, namely, the issuer for the issuance, the account of the transferer for the transfer, and the account of the consumer for the consumption.

The receiver demand ticket schema ID stated in each of the issuance condition 620, the transfer condition 630 and the consumption condition 640 refers to a certificate of inscription which must be retained by a receiving device when the ticket is put in circulation, namely, the account of the person to whom the ticket is issued for the issuance, the account of the transferee for the transfer, and the ticket examiner for the consumption. In the preset embodiment, the circulation condition such as the issuance condition, the transfer condition, the consumption condition or the like is specified by the schema ID of the certificate of inscription which must be retained in the transmitter or the receiver as mentioned above. However, as an alternative choice, an public key of CA (certificate authority) bureau which issues a certificate of inscription or an identifier of an public key certificate may be specified, and the retention of the public key certificate issued by the CA bureau may be used as the circulation condition. Any one of the issuance condition, the transfer condition and the consumption condition may be omitted depending on the embodiment.

The owner ID 605 represents the identifier of the owner of the ticket. The issuer signature 606 is a signature which is made by the issuer unit.

The signature 606 of the issuer unit is the signature which guarantees the contents mentioned under 601 to 644. The signature is made with respect to the combination of 601 to 644. ESIGN of NTT or the like may be used as a signature technique.

Certificate of Transfer/Consumption

FIG. 6 shows an example of the certificate of transfer. A certificate of transfer 60B is a proof of the transfer of the electronic ticket 60A. Specifically, it indicates that the owner ID 605 stated in the electronic ticket 60A being transferred is changed to the owner ID of the transferee user. Subsequently, during the transfer of the electronic ticket, the certificate of transfer is attached to the electronic ticket for purpose of circulation. As shown in FIG. 6, the format of the certificate of transfer 60B remain the same as the format for the electronic ticket 60A, and the issuer ID 603 is the transferer ID or the owner ID of the ticket being transferred. The rights information 610 in the certificate of transfer 60B may comprise a transfer ticket schema ID, a transfer ticket ID and date of issuance. The owner ID of the transferee is stated under the owner ID 605. The issuer signature is made by the transferee. Each time the electronic ticket is transferred, the certificate of transfer with signature on which the current owner ID 603 and the new owner ID 605 are recorded is attached thereto.

As shown in FIG. 7, the certificate of consumption 60C has the same format as the certificate of transfer shown in FIG. 6, and therefore will not be described. However, while the certificate of transfer 60B provides a proof of the transfer of the electronic ticket 60A, the certificate of consumption with signature 60C provides a proof of the consumption of the electronic ticket 60A. As a result of the consumption, the owner ID 605 of the original electronic ticket 60A is entered in the issuer ID 603 of the certificate of consumption 60C, and the owner ID 605 remains blank.

It is also possible to implement the certificate of consumption as a certificate of transfer indicating that a new owner is NULL. In another embodiment, rather than implementing the certificate of transfer in the form of an electronic ticket, it may comprise a trio of a signature 60B3 by the current owner with respect to a set of ticket information 60B1 indicating an object being transferred and a new owner ID 60B2 as shown in FIG. 8A. In the similar manner, rather than implementing the certificate of consumption in the form of an electronic ticket, it may comprise a trio of a signature 60C3 by a current owner with respect to a set of ticket information 60C1 indicating an object being consumed and a new owner ID (NULL) 60C2 as shown in FIG. 8B. It is possible to specify ticket information in terms of schema ID+ticket ID of the electronic ticket, a hashed value of the entire electronic ticket or an issuer signature of the electronic ticket.

A consumed electronic ticket is transmitted to the system manager center 700 together with any certificate of consumption with signature and/or any attached certificate of transfer with signature which may have been prepared in connection with this electronic ticket in order to detect any illicit use such as a double use by verifying the succession of owner ID's (the continuity of successive owners) on the series of attached certificates of transfer and consumption with signature, for example, thus pursuing a profiteer in the event of an illicit use. However, such certificate or certificates of transfer and consumption with signature may not be attached where there is no need for a later detection of a dishonest user for a double use or when an electronic ticket which has been used on the on-line has been made open to the public.

Certificate of User Inscription

FIG. 9 shows an example of a certificate of user inscription. A certificate of user inscription 60D is a kind of membership card which is required in the circulation of the electronic ticket 60A. An inscription organization such as CA guarantees the identification of the user to permit a circulation of the electronic ticket. The certificate of user inscription 60D has the similar format as the electronic ticket 60A. In FIG. 9, an issuer ID 603 represents the identifier of an inscription organization. An issuer signature 606 represents a signature of the inscription organization.

Certificate of Ticket Examiner Inscription

FIG. 10 shows an example of a certificate of ticket examiner inscription. A certificate of ticket examiner inscription 60E signifies the right to perform a ticket examination during the consumption (use) of the electronic ticket in any circulation process of the electronic ticket, and a variety of rights 604 represents a certificate of the right to examine the ticket.

The certificate of ticket examiner inscription is issued by a service provider who intends a circulation of a certain electronic ticket 60A, for example, as a license to examine, to a person who actually examines the electronic ticket. The owner of the certificate of ticket examiner inscription is specified under an owner ID 605, and a signature of the issuer unit with respect to the certificate of ticket examiner inscription is given under an issuer signature 606.

To give an example, the transmitter demand ticket schema 643 given under the consumption condition of the electronic ticket shown in FIG. 5 states a certificate of user inscription which is also referred to as a certificate of the right to consume which must be retained by a transmitting side, namely, a user who intends to consume. If the consumer does not possess the certificate of user inscription, he cannot consume this electronic ticket. Similarly, the receiver demand ticket schema 644 under the consumption condition states a certificate of ticket examiner inscription which must be retained by the receiving side or a ticket examiner. If the ticket examiner does not possess the certificate of the ticket examiner inscription which is here stated, the consumer must not allow the ticket examiner to examine this ticket.

Certificate of Account Address

FIG. 11 shows a certificate of account address 60F which is one example of the address certificate. An account address refers to an address of an account unit which is assigned to a user, and in the present embodiment, it is specified by using URI (Universal Resource Identifier) standardized by IETF or the like. However, any other representation such as an account manager ID+serial number which has a unique value may also be used.

An owner ID represents an identifier of the owner of an electronic ticket. In the present embodiment, each user holds a unique portable processor, the identifier of which is used as a user ID and is also used as an owner ID of the certificate of account address. An identifier of the portable processor may use a value which is determined according to any method provided it has a unique value, such as a portable processor issuer ID+serial number, an public key of a signature unit within the portable processor, a hashed value of the public key, an identifier of the certificate of public key, a hashed value of the certificate of public key or the like.

The certificate of account address 60F guarantees a correspondence relationship between the account address and the user ID, and is signed by a trustworthy account managing center, CA bureau, a user himself or the like.

The account address may be directly used as the user ID. However, when this choice is made, when it becomes necessary to change the user ID for reason that the user has lost the portable processor, it becomes necessary that the account address be also changed. However, the account address is an item which is broadly informed to enterprises and individuals with whom a trading relationship is maintained, in the similar manner as a bank account number or an electronic mail address, and it is not a simple matter to change it frequently. On the other hand, when the user ID and the account address are made separate from each other while the correspondence relationship is guaranteed by a certificate of account address, there is an advantage that when the user ID is changed, a re-issue of a new certificate of account address does away the need to change the account address.

A single user can retain a plurality of account units. An implementation is therefor possible in which the same account address is assigned to each of these account units and a particular account unit which is utilized may be changed depending on the variety of the electronic ticket which stores it or the current location of the user. For example, when PC of a user's home is connected to a network, an account unit on the PC may be utilized. At other time, the account unit may be switched to an account unit on the host of a contracted internet provider. An account address which is representative of a plurality of account units is referred to as a representative address, in particular.

In FIG. 11, a variety of right 604 represents a certificate of account address, and rights information 610 comprises an account address. The owner ID is usually changed as the portable processor 400 or the key is changed, and thus the use of the certificate of account address provides an advantage that a change in the account or the key can be easily accommodated for in implementing the electronic ticket.

Flow Chart

An embodiment of the issuer unit 100, the account unit 210, the user terminal unit 300 and the ticket examiner units 500, which are components of the invention in the system shown in FIG. 1, will now be described with reference to the drawings.

Access from User Terminal Unit to Account Unit

Figure 12:
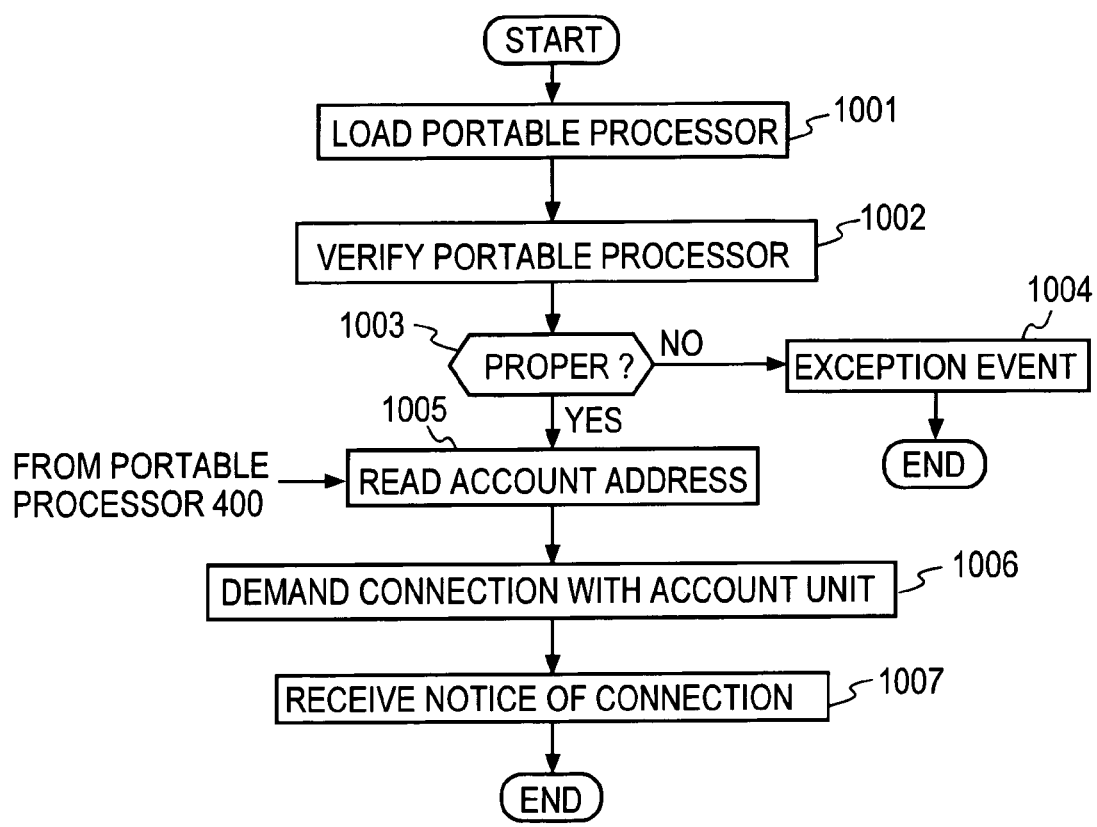
FIG. 12 is a chart showing a main flow of a user authenticator upon accepting a portable processor.

FIG. 12 shows a flow of the user terminal unit 300 when the portable processor (such as IC card) 400 is accepted.

Step 1001: The portable processor 400 is connected to the junction 303 (FIG. 3B) of the user terminal unit 300.

Step 1002: The portable processor 400 is verified to render a decision to see if it is portable processor adapted to the present system. In the event the portable processor 400 finds that the user terminal unit 300 is not trustworthy, the portable processor 400 may verify the user terminal unit.

Step 1003: A decision is rendered on a result of verification.

Step 1004: In the event of a failed verification or finding that the portable processor is not adapted, an exception event is raised, and the treatment is terminated.

Step 1005: If the portable processor is adapted, the account address of the account unit is read from the storage 402 of the portable processor 400.

Step 1006: A connection to the electronic ticket processor 203 of the account unit 210 which is indicated by the account address is demanded.

If the portable processor 400 is found not to be trustworthy as viewed from the account unit 210, it is possible that the account unit 210 verifies the portable processor 400. A technique for this verification may comprise a confirmation to see if the portable processor 400 contains a secret key corresponding to the account unit 210.

Conversely, if the account unit 210 is found not to be trustworthy as viewed from the portable processor 400, it is possible that the portable processor verifies the account unit. In this instance, if the account unit 210 itself does not contain a secret key, the managing center 200 which manages the account unit 210 may provide an authentification key, and the user may use this key to verify the managing center 200. The electronic ticket processor 203 of the account unit 210 which has received the connection demand executes the connection with the user terminal unit 300.

Step 1007: When the connection with the electronic ticket processor 203 of the account unit 210 is successfully made, a connection notice is received from the account unit 210, thus completing the connection.

A configuration in which the portable processor 400 is separate from the user terminal unit 300 is illustrated here, but it is also possible that the user terminal unit 300 itself has the authentification function, thus providing an integral configuration.

Figure 29:
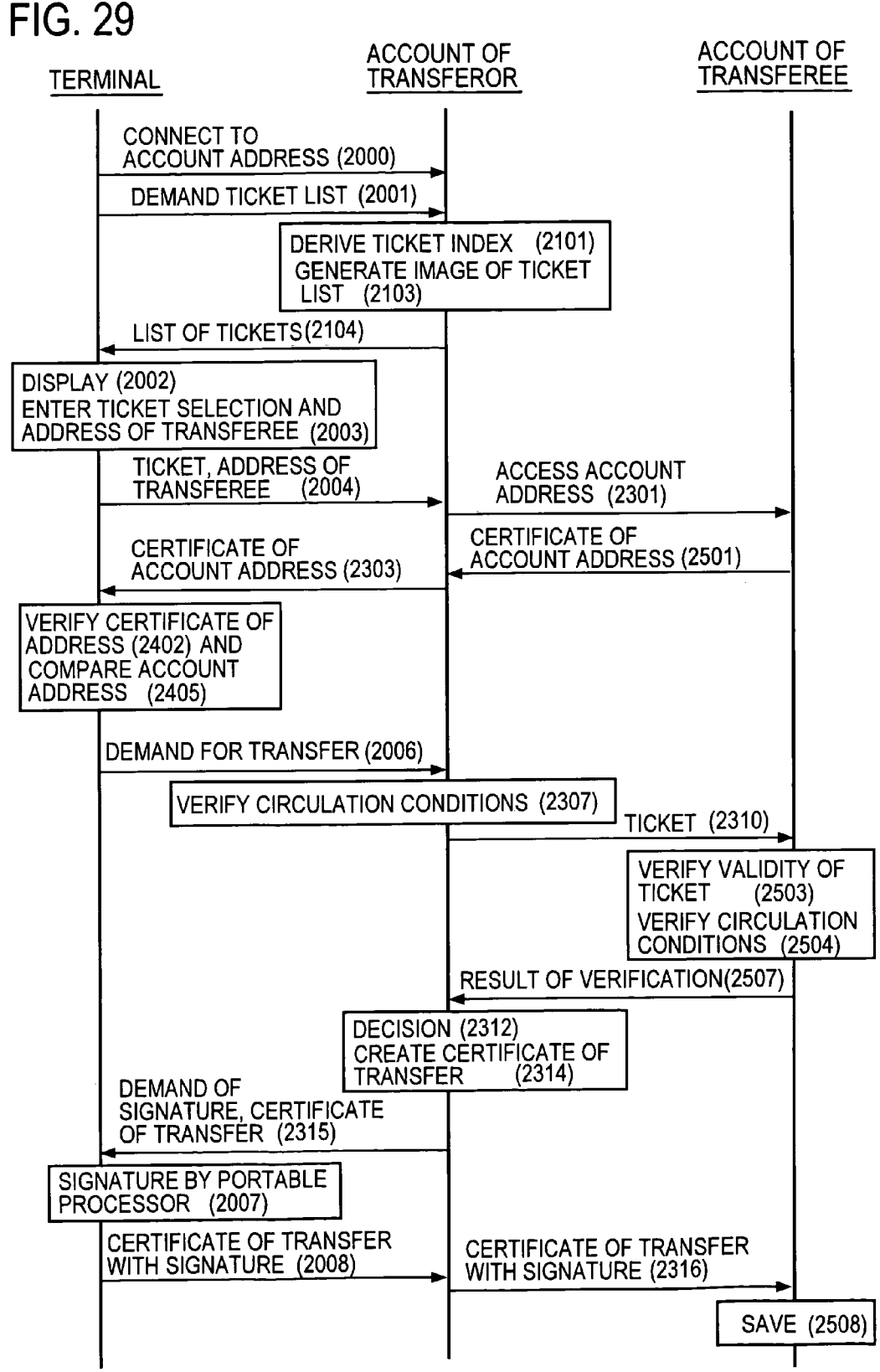
FIG. 29 diagrammatically shows an entire sequence during a transfer treatment.

Transfer (See FIG. 29)

Figure 13:
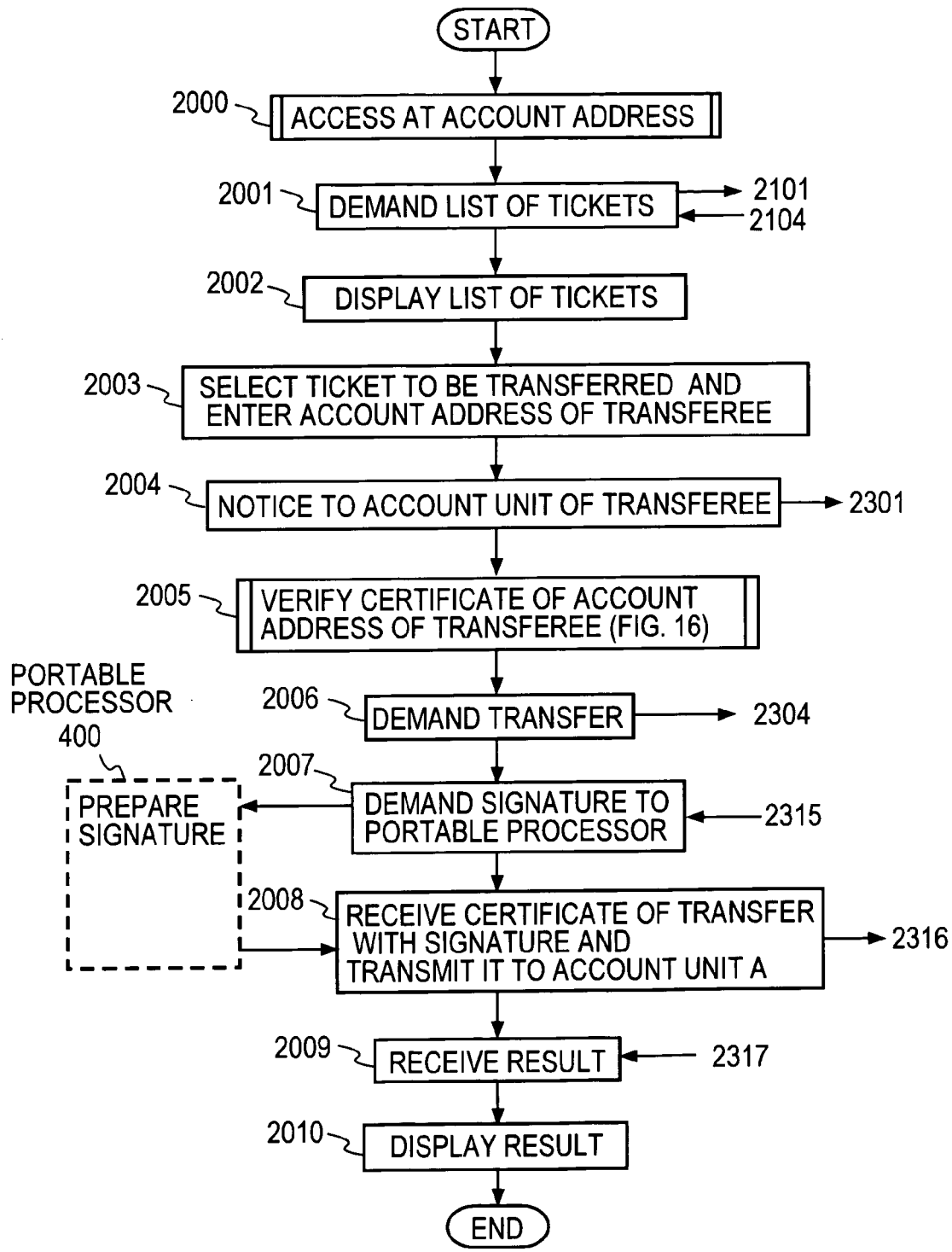
FIG. 13 is a chart showing a main flow occurring on a display of a transferer user upon a transfer.

FIG. 13 shows a main flow which is executed by the terminal controller 302 of the user terminal unit 300A on the transferer site during a transfer of an electronic ticket.

Step 2000: Either by a manual input using the input unit 304, for example, or by the connection technique shown in FIG. 12, a user A inputs the account address of his own account unit 210A to the user terminal unit 300 for connection with the account unit 210A thereof.

Step 2001: The terminal controller 302 demands the account controller 202 of the account unit 210A to show a list of electronic tickets information which is stored in the storage 212.

Step 2002: The list of electronic tickets which is received from the account unit 210A is displayed on the display 301.

Step 2003: A ticket to be transferred is selected from the displayed list by using the input unit 304, and the account address of a transferee user B is inputted.

Step 2004: The specified electronic ticket and the account address of the transferee user B are communicated to the account unit 210A.

Step 2005: A certificate of account address of the transferee is received from the account unit 210A and is verified.

Step 2006: A result of verification of the certificate of the account address and a demand for the execution of the transfer treatment are transmitted to the account controller 202 of the account unit 210A.

Step 2007: A certificate of transfer is received from the account controller 202, and is then transmitted to the portable processor 400A, demanding a signature.

Step 2008: A certificate of transfer with signature is received from the portable processor 400A, and is then transmitted to the account unit 210A.

Step 2009: A result of the execution of the transfer treatment is received from the account unit 210A.

Step 2010: A result of execution is displayed on the display 301.

Figure 14:
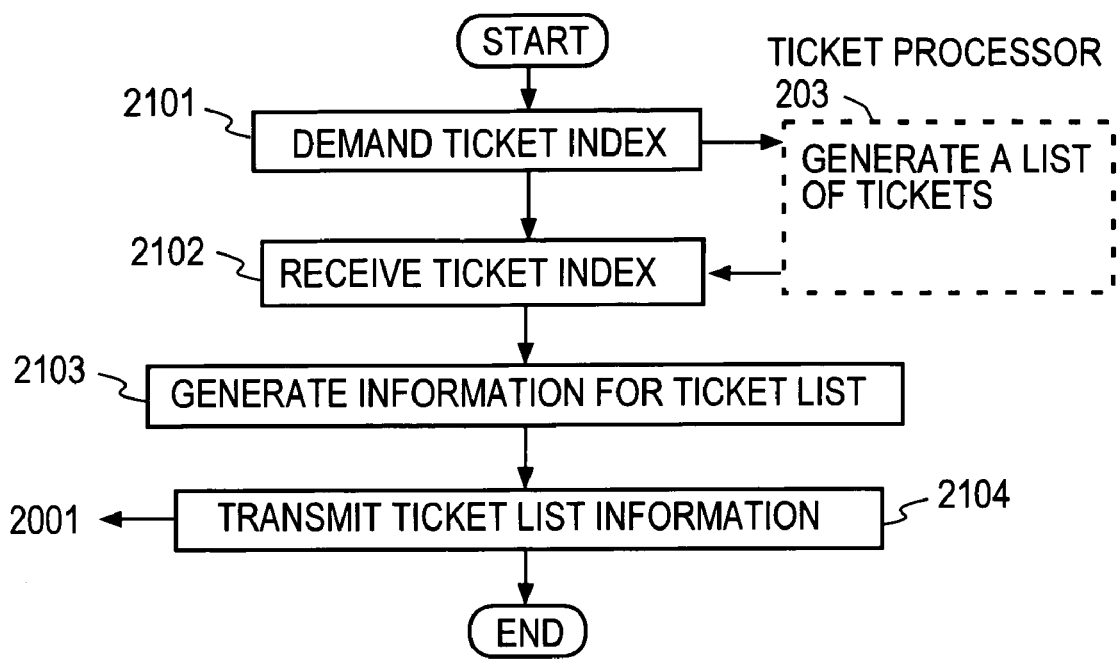
FIG. 14 is a flow chart of an account controller upon displaying a list of tickets.

FIG. 14 shows a flow of the account controller 202 generating a list of electronic tickets which is demanded at step 2001 in FIG. 13.

Step 2101: The account controller 202 demands a ticket index to the electronic ticket processor 203.

The electronic ticket processor 203 derives a ticket index retained by the storage 204, and transmits it to the account controller 202.

Step 2102: The account controller 202 receives the transmitted ticket index.

Step 2103: A screen generating information (for example, html image information) for the ticket list information is generated on the basis of the acquired index information.

Step 2104: The screen of the ticket list information thus generated is transmitted to the demanding user terminal unit 300.

Figure 15:
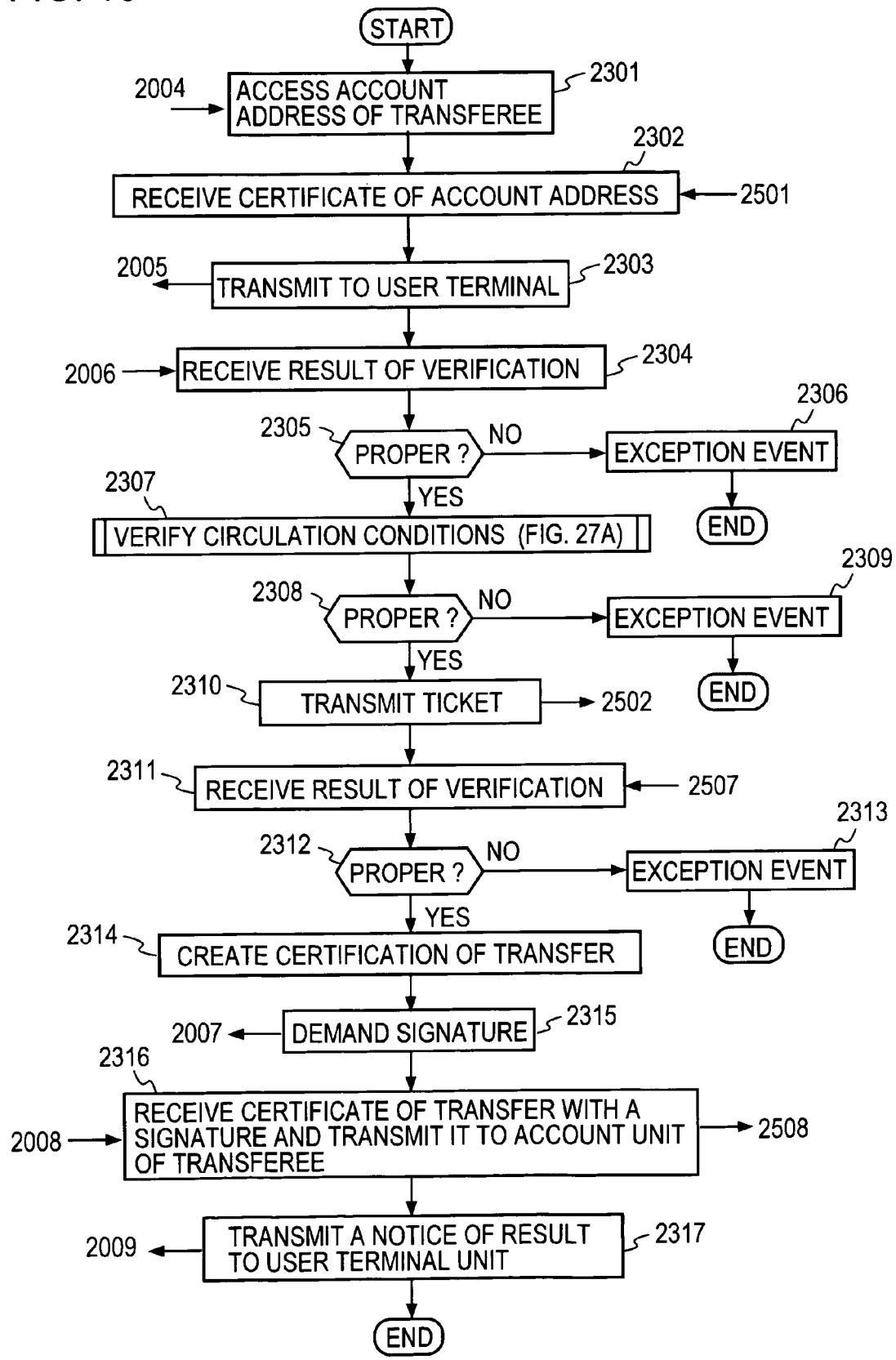
FIG. 15 is a view showing a main flow in an electronic ticket processor associated with a transferer account unit upon a transfer.

FIG. 15 shows a main flow executed by the electronic ticket processor 203 under the control of the account controller 202 of the transferer account unit 210 in response to the transferee account address which has been transmitted at step 2004 in FIG. 13.

Step 2301: To begin the treatment, an access is initially made to the transferee account unit 210B at the transferee account address which is received from the user terminal unit 210A.

Step 2302: As a result of the access, a certificate of account address is transmitted from the transferee account unit 210B.

Step 2303: The certificate of account address which is transmitted is transmitted to the demanding user terminal unit 300A (to step 2005 in FIG. 13).

Step 2304: The result of verification and a demand for the transfer which are transmitted at step 2006 from the user terminal unit are received.

Step 2305: A decision is rendered upon the result of verification.

Step 2306: If the result of verification is failing, an exception event is raised, and the treatment is terminated.

Step 2307: A circulation condition of the transferee which is stated on the ticket is verified.

Step 2308: A decision is rendered on a result of verification.

Step 2309: If the verification fails, an exception event is raised, and the treatment is terminated.

Step 2310: If the condition is complied with, the ticket body is transmitted to the account unit 210B of the transferee side.

Step 2311: The result of verification at the transferee side is transmitted, and thus is received.

Step 2312: A decision is rendered upon the result of verification.

Step 2313: If the result of verification is failing, the treatment is terminated.

Step 2314: If the result of verification is proper, a certificate of transfer is prepared.

Step 2315: The certificate of transfer is transmitted to the user terminal unit 300A of the transferer side, demanding a signature (to step 2007 in FIG. 13).

Step 2316: The certificate of transfer with signature is received from the user terminal unit 300A, and is then transmitted to the account unit of the transferee.

Step 2317: A report that the transfer has been completed is transmitted to the user terminal unit 300 (to step 2009 in FIG. 13).

Figure 16:
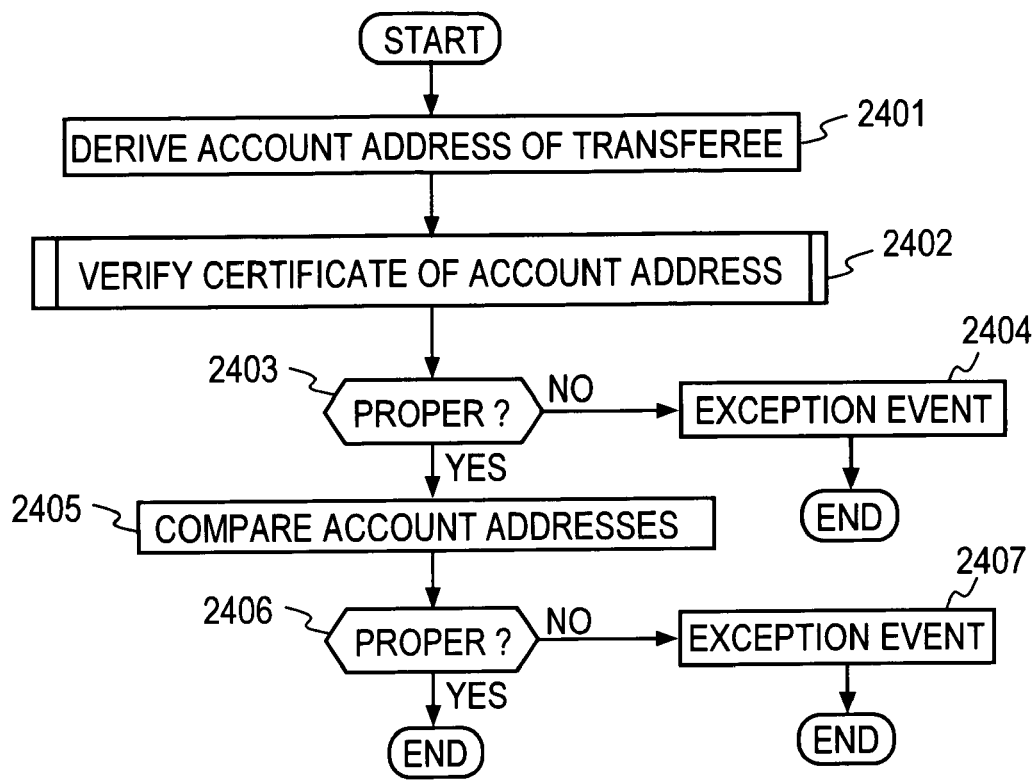
FIG. 16 is a flow chart of a verification of an account address in a user terminal unit.

FIG. 16 shows a flow of the verification of a certificate of account address which takes place at step 2005 in the user terminal unit 300A.

Step 2401: The certificate of account address of the transferee which is transmitted from the own account unit 210A at step 2303 in FIG. 15 is received.

Step 2402: The validity of the certificate of account address is verified.

Step 2403: A decision is rendered upon the result of verification.

Step 2404: If it is revealed as a result of the verification that the certificate is not proper, an exception event is raised and the treatment is terminated.

Step 2405: If the certificate is found to be proper, a verification is made to see if a coincidence is reached between the account address of the transferee which is inputted by the transferer user at step 2003 and the account address which is described on the certificate of account address of the transferee which is received at step 2401.

Step 2406: A decision is rendered upon the result of verification.

Step 2407: If the coincidence is not found, an exception event is raised and the treatment is terminated.

Step 2408: If the coincidence is reached, the treatment is then terminated, proceeding to step 2006 in FIG. 13.

Figure 17:
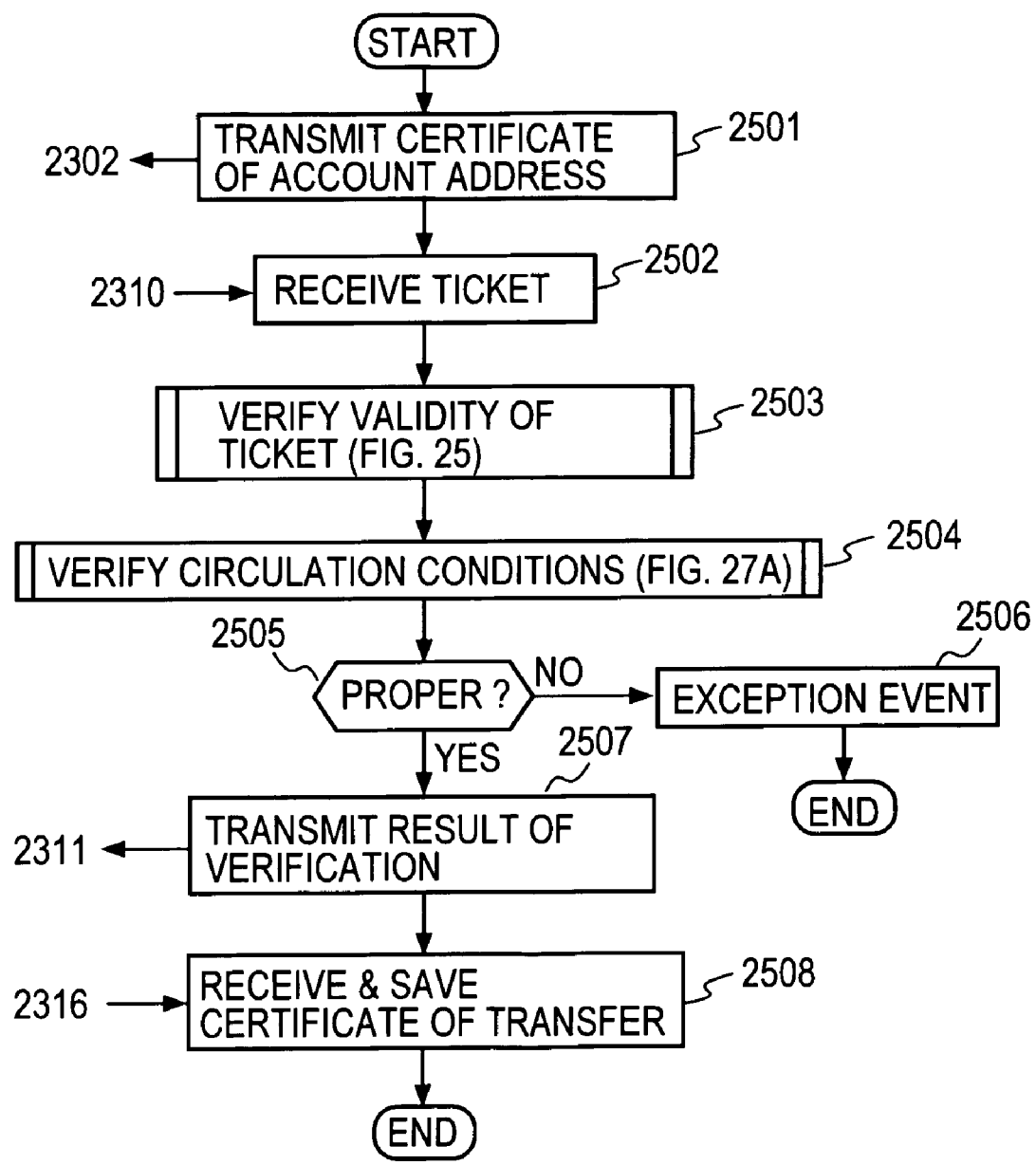
FIG. 17 is a chart showing a main flow in an electronic ticket processor of a transferee account unit upon a transfer.

FIG. 17 shows a main flow of the electronic ticket processor of the account unit 210B of the transferee during the transfer.

Step 2501: When the transfer treatment is demanded from the transferer account unit 210A, a certificate of account address is initially transmitted to the transferee account unit 210A.

Step 2502: An electronic ticket body is received from the transferer account unit.

Step 2503: The validity of the received ticket is verified.

Step 2504: The transferer circulation condition which is described on the received ticket is verified.

Step 2505: A decision is rendered upon the result of verification.

Step 2506: If it is found that the circulation condition is not agreed with, an exception event is raised and the treatment is terminated.

Step 2507: If the circulation condition is agreed with, the result of verification is communicated to the transferer account unit 210A while retaining the electronic ticket body.

Step 2508: The certificate of transfer is received from the transferer account unit 210A, and is attached to the ticket body which is previously received to be stored in the storage, whereupon the treatment is terminated.

Figure 30:
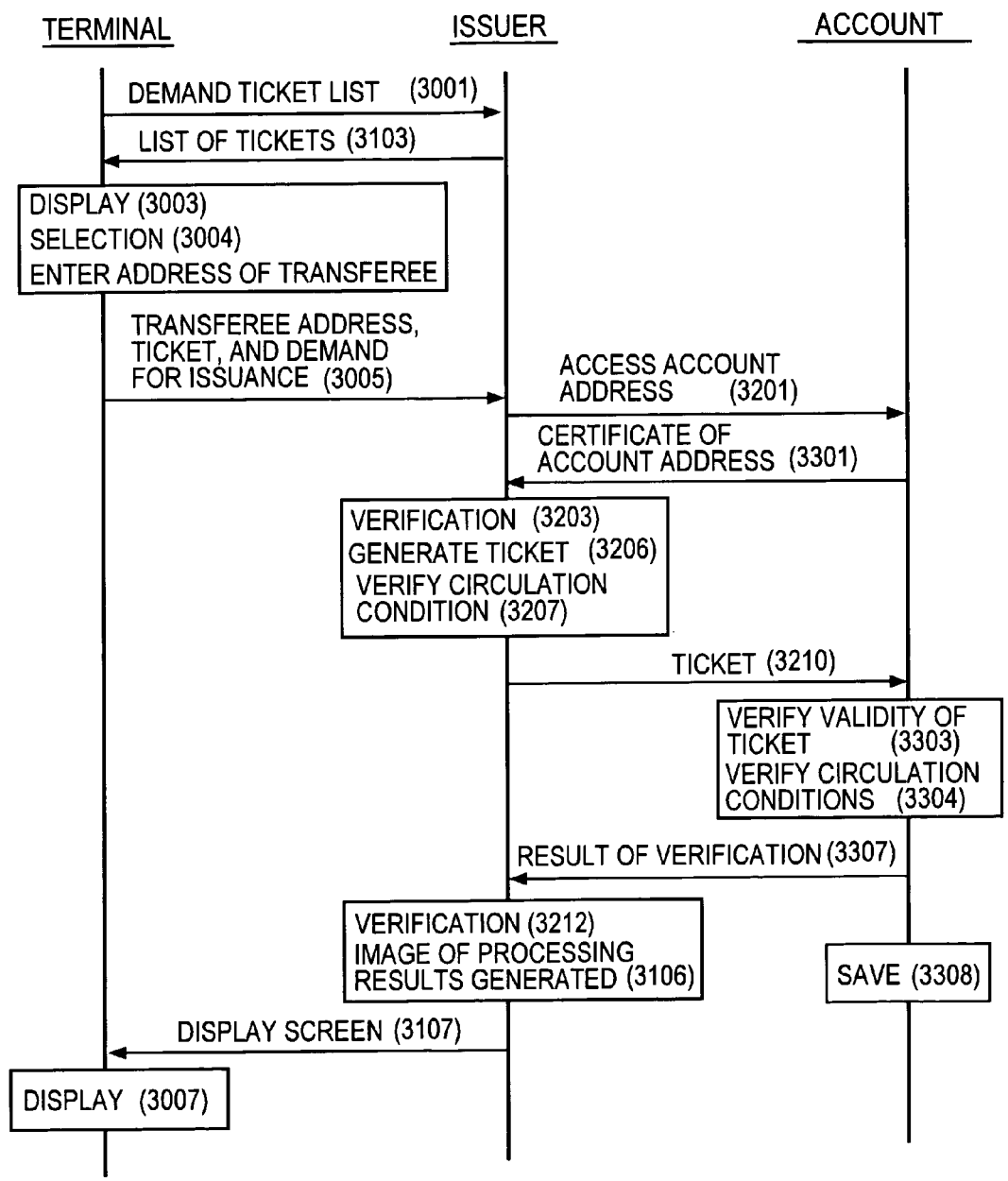
FIG. 30 diagrammatically shows an entire sequence during an issuance treatment.

Issuance (see FIG. 30)

A treatment which occurs when selecting a desired ticket from plays, sports, concerts or the like on the issuer unit 100, acting as a ticket bureau, for example, through the internet and having an electronic ticket issued (or purchased) will be described.

Figure 18:
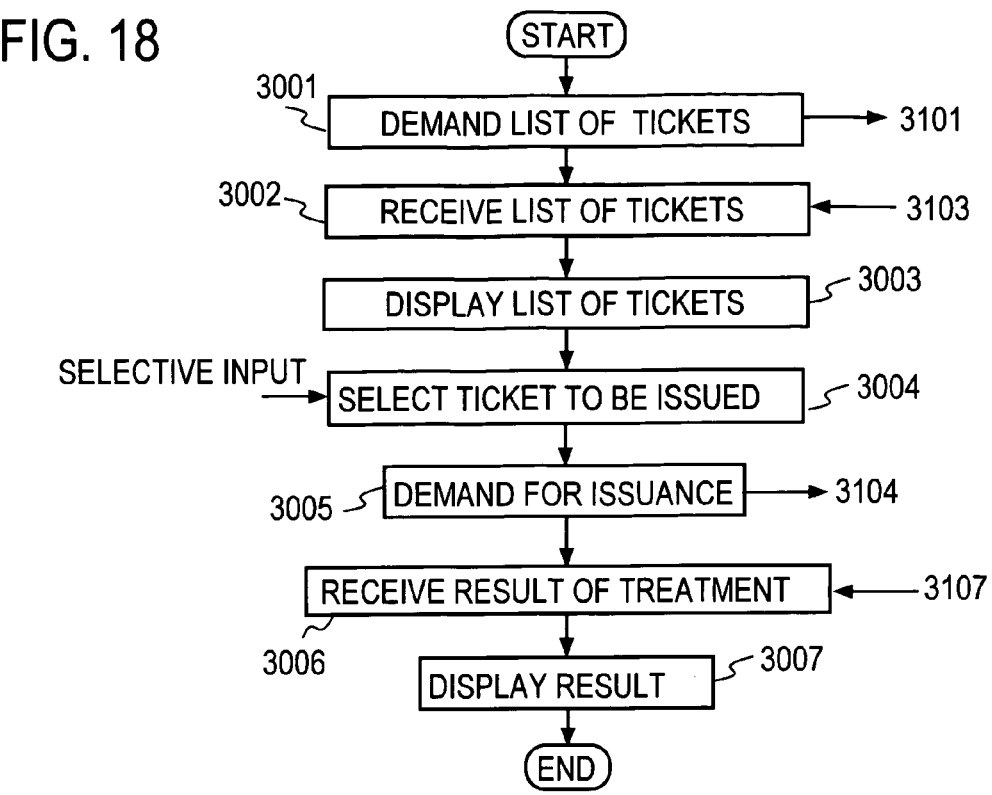
FIG. 18 is a chart showing a main flow in a display of a transferee user terminal unit upon issuance.

FIG. 18 shows a main flow in the user terminal unit during the issuance of an electronic ticket.

Step 3001: The user terminal unit 300 demands the issued information generating controller 101 of the issuer unit 100 (FIG. 2A) to show a list of electronic tickets which are being issued by the issuer unit.

The issued information generating controller 101 transmits information representing the list of electronic tickets which can be issued to the user terminal unit.

Step 3002: The terminal controller 302 receives the list of electronic tickets.

Step 3003: The list of electronic tickets which is received is displayed on the display 301.

Step 3004: A user (purchaser or transferee) selects an electronic ticket, the issuance of which he desires, from the electronic tickets displayed in the list, and inputs the account address of the account unit of the transferee. The account address may be inputted from the input unit 304 of the user terminal unit 300 when accepting the issuance or may be acquired from the portable processor 400 which is loaded into the user terminal unit 300.

Step 3005: A demand for the execution of an issuance treatment is transmitted to the issued information generating controller 101 together with the electronic ticket selection information representing the selected electronic ticket.

Step 3006: A result of the execution of the issuance treatment (an electronic ticket) is transmitted from the issued information generating controller 101, and thus is received.

Step 3007: The result of the execution of the treatment is displayed on the display 301.

Figure 19:
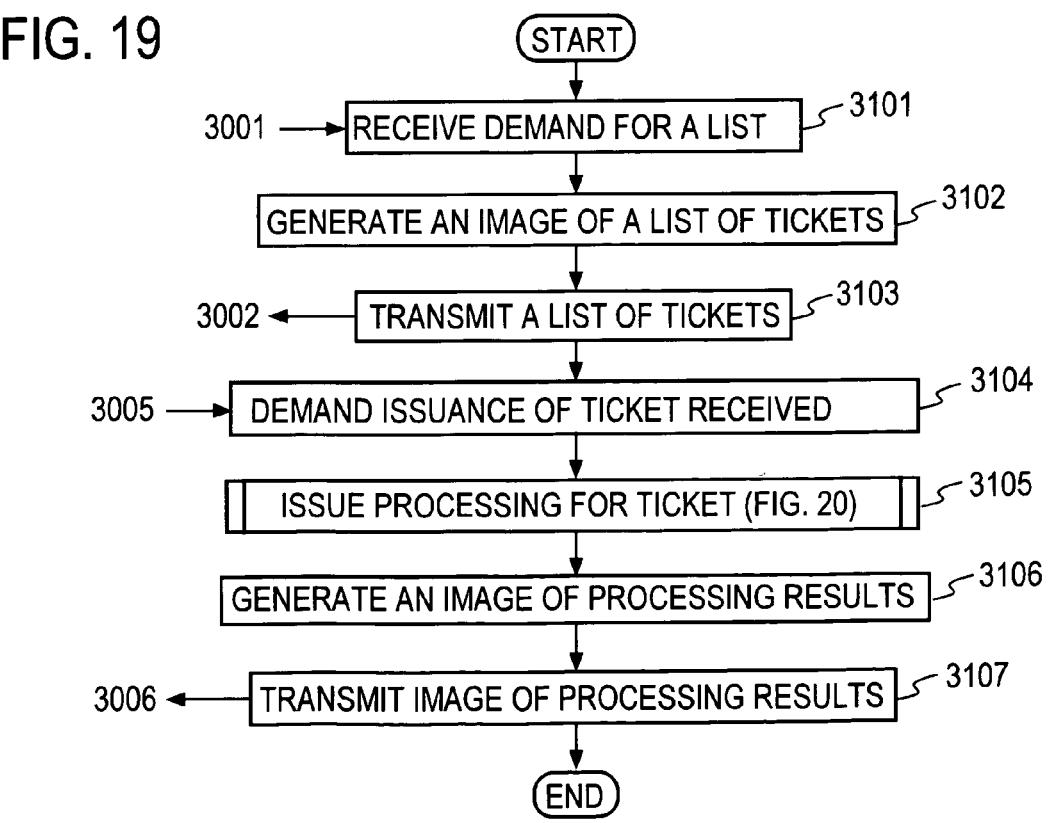
FIG. 19 is a flow chart of an issued information generation controller upon issuance.

FIG. 19 shows a flow in the issued information generating controller 101 of the issuer unit 100 during the issuance of an electronic ticket.

Step 3101: Upon receiving a demand for the list of electronic tickets, the issue controller 101 demands the electronic ticket processor 102 to generate a list of electronic tickets.

Step 3102: The electronic ticket processor 102 generates an image data for the list of electronic tickets which can be issued.

Step 3103: The issue controller 101 transmits the image data of the list of electronic tickets to the demanding user terminal unit 300.

Step 3104: The issue controller 101 receives a demand for issuance of an electronic ticket and an electronic ticket selection information from the user terminal unit 300.

Step 3105: The electronic ticket processor 102 executes a demanded electronic ticket issuance treatment (FIG. 20).

Step 3106: The electronic ticket processor 102 generates display image information which indicates a result of issuance treatment.

Step 3107: The issued information generating controller transmits the generated display image information to the user terminal unit 300A.

Figure 20:
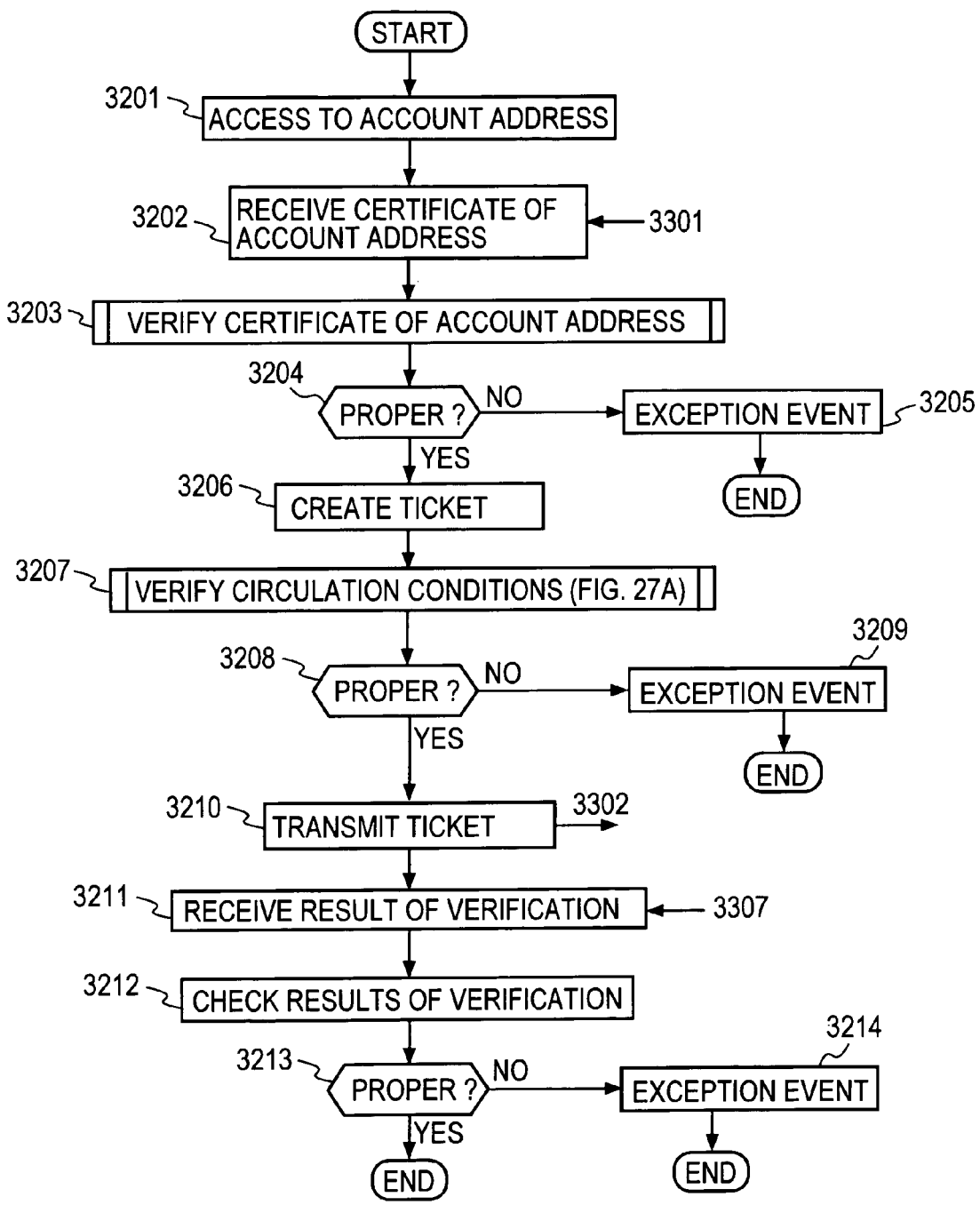
FIG. 20 is a chart showing a main flow in an electronic ticket processor associated with an issuer unit upon issuance.

FIG. 20 shows a flow of the issuance treatment of an electronic ticket which takes place at step 3105 during the issuance of an electronic ticket in FIG. 19.

Step 3201: To begin the treatment, an access is made to the account unit of the transferee (the entity demanding the issuance) at the account address, in the similar manner as the treatment shown in FIG. 15. Step 3202: As a result of the access, a certificate of the account address is transmitted.

Step 3203: The validity of the certificate of account address which is transmitted is verified.

Step 3204: A decision is rendered upon the result of verification.

Step 3205: If the certificate of account address is found not to be proper, an exception event is raised and treatment is terminated.

Step 3206: If the certificate is found to be proper, an electronic ticket is prepared on the basis of a user ID described on the certificate of account address (with the user identifier embedded into the ticket) and is issued.

Step 3207: The receiver circulation condition described on the ticket thus prepared is verified.

Step 3208: A decision is rendered upon the result of verification.

Step 3209: If the described condition is not agreed with, an exception event is raised and the treatment is terminated.

Step 3210: If the condition is agreed with, the electronic ticket body is transmitted to the account unit of the transferee (the user demanding the issuance).

Step 3211: A variety of verifications of the transmitted electronic ticket are also made on the transferee account unit, and results of such verifications, are then received.

Step 3212: The received result is verified.

Step 3213: Whenever a problem occurs, an exception event is raised and the treatment is terminated.

Figure 21:
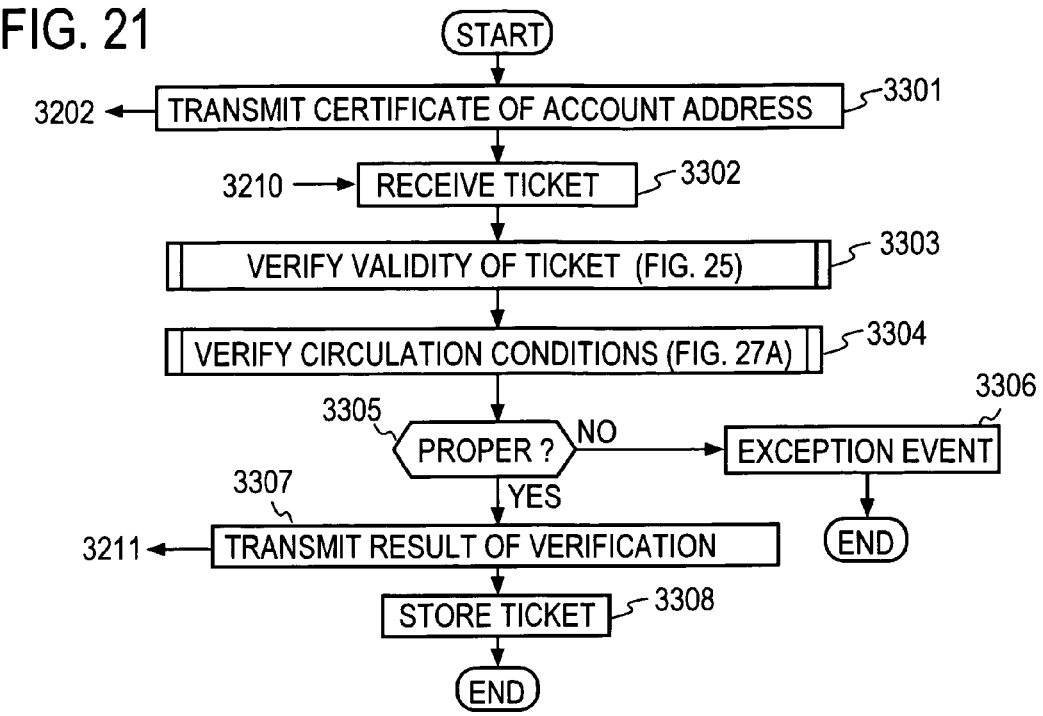
FIG. 21 is a chart showing a main flow in an electronic ticket processor of a transferee account unit upon issuance.

FIG. 21 shows a main flow in the electronic ticket processor of the account unit 210 of the transferee during the issuance of an electronic ticket.

Step 3301: When there is an access from the issuer unit 100 (step 3201 in FIG. 20) and the issuance treatment is demanded, a certificate of account address is initially transmitted.

Step 3302: An electronic ticket body is transmitted from the issuer unit, and thus is received.

Step 3303: The validity of the received electronic ticket is verified.

Step 3304: The transmitter circulation condition which is described on the received ticket is verified.

Step 3305: A decision is rendered upon the result of verification.

Step 3306: If the circulation condition is not agreed with, an exception event is issued and the treatment is terminated.

Step 3307: If the circulation condition is agreed with, the electronic ticket is stored in the storage 204 and the result of verification is communicated to the issuer unit.

Step 3308: The electronic ticket is stored in the storage 204 and the treatment is terminated.

In the described embodiment, an electronic ticket is stored in an account unit on a network. However, an electronic ticket stored in an equivalent account unit may be downloaded into a portable account unit, and the account unit in which the electronic ticket is stored may be physically carried by a user together with a portable processor, whereby the ticket examination may be performed in exactly the same manner as in the present embodiment for an off-line ticket examiner unit which is not provided with an equipment for connection with an account unit on the network, by allowing the portable account unit to be connected when the ticket examination is to be made. In this instance, the account unit and the portable processor may be located within one physical unit.

Figure 31:
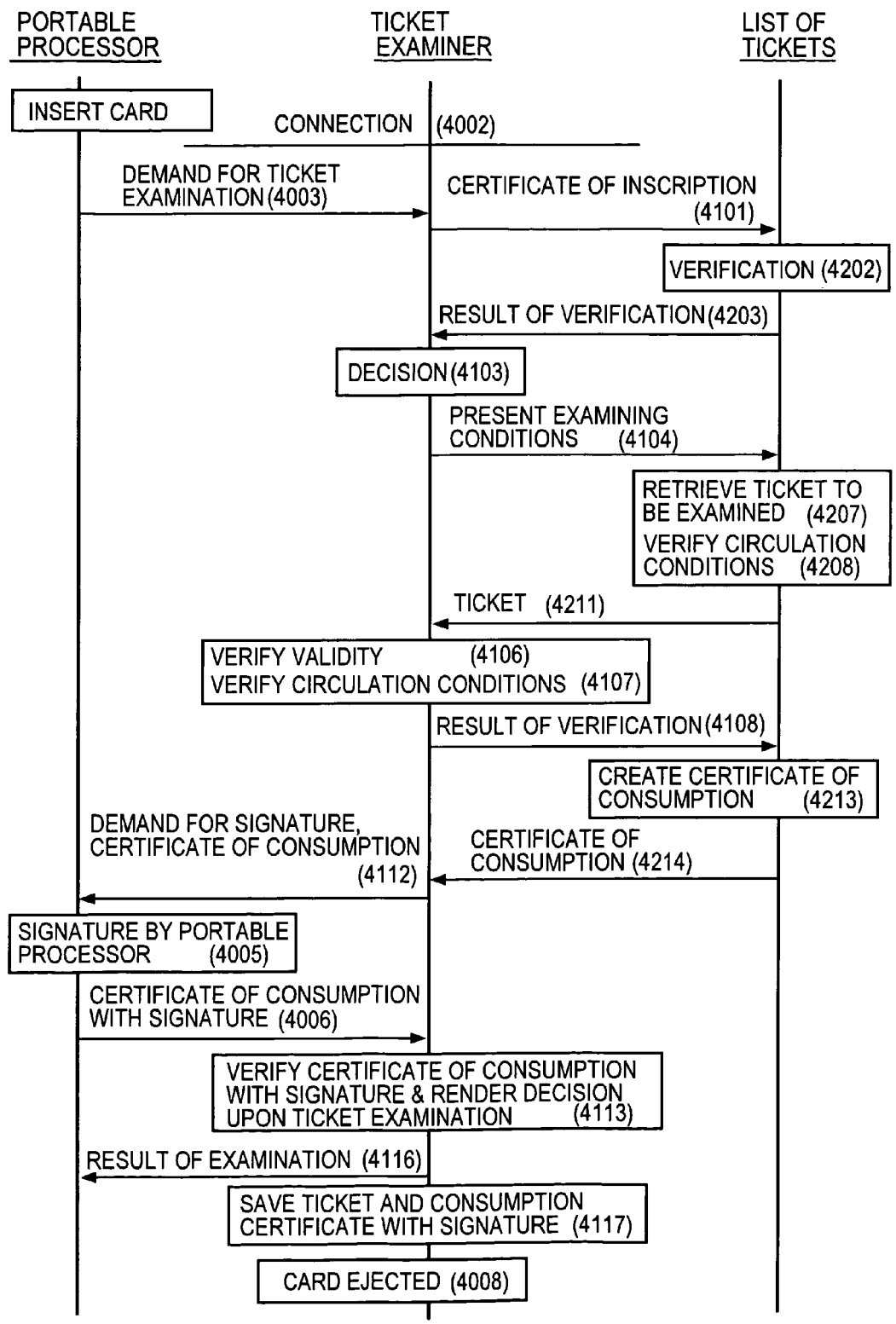
FIG. 31 diagrammatically shows an entire sequence during a consumption treatment.

Consumption (see FIG. 31)

Figure 22:
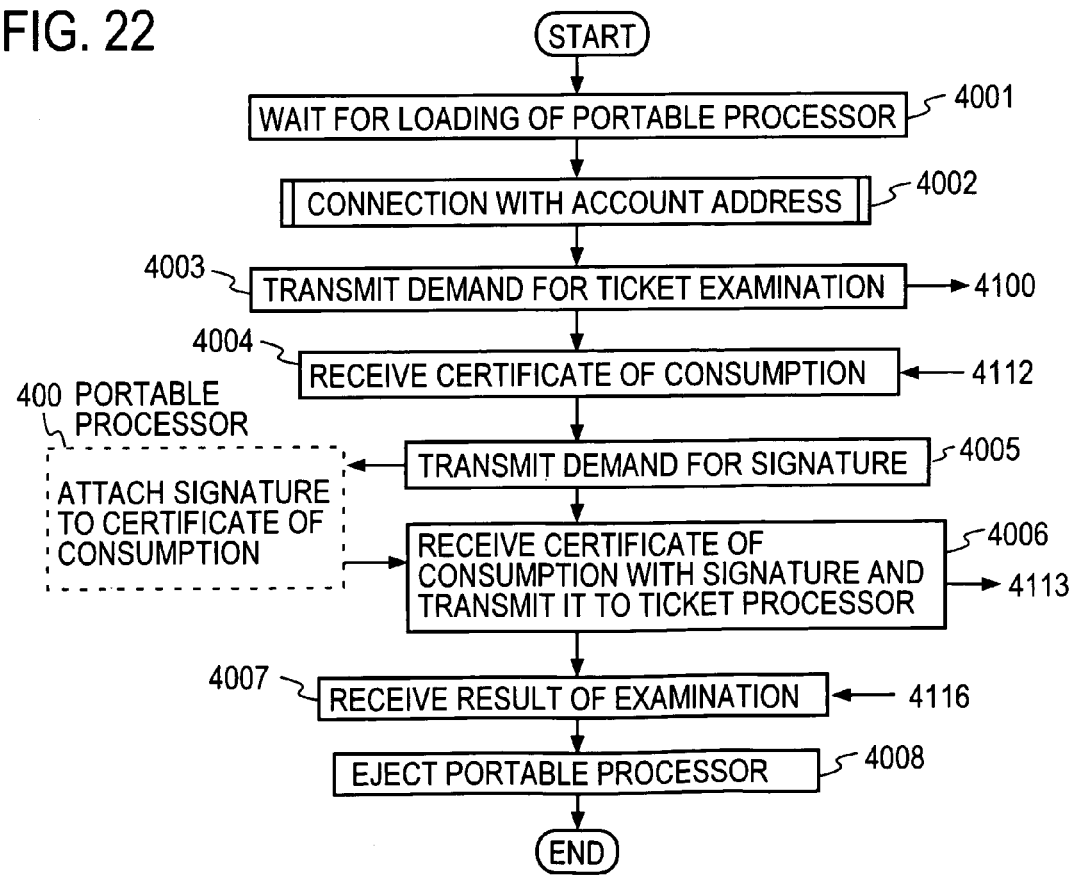
FIG. 22 is a flow chart of a user terminal unit upon consumption.

FIG. 22 shows a main flow which is executed by the ticket examining controller 501 of the ticket examiner units 500 during the consumption of an electronic ticket. In this example of treating the consumption of the electronic ticket, it is assumed that a user previously purchases a ticket for admission into a concert hall, for example, and the electronic ticket which is saved in his account is to be examined during its use. Accordingly, in this example, the ticket examiner unit performs an examination of a particular variety of electronic ticket, which is a concert admission ticket.

Step 4001: The ticket examining controller 502 (FIG. 4B) waits for the portable processor (IC card) to be inserted into the junction 503.

Step 4002: When the portable processor is inserted, a connection between the ticket examiner unit and the account unit of the user is made according to the connection procedure between the terminal and the account unit which has been mentioned in connection with FIG. 12.

Step 4003: A ticket examining treatment is demanded to the electronic ticket processor 501 within the ticket examiner unit.

Step 4004: A certificate of consumption is received from the account unit 210 of the user.

Step 4005: The certificate of consumption is transmitted to the portable processor 400, demanding a signature to the certificate of consumption.

Step 4006: The certificate of consumption with signature is received from the portable processor 400, and is transmitted to the electronic ticket processor 501 within the ticket examiner unit 500.

Step 4007: The ticket examining controller 502 receives a result of the ticket examining treatment performed by the electronic ticket processor 501.

Step 4008: The ticket examining controller demands the junction 503 to eject the portable processor.

Figure 23:
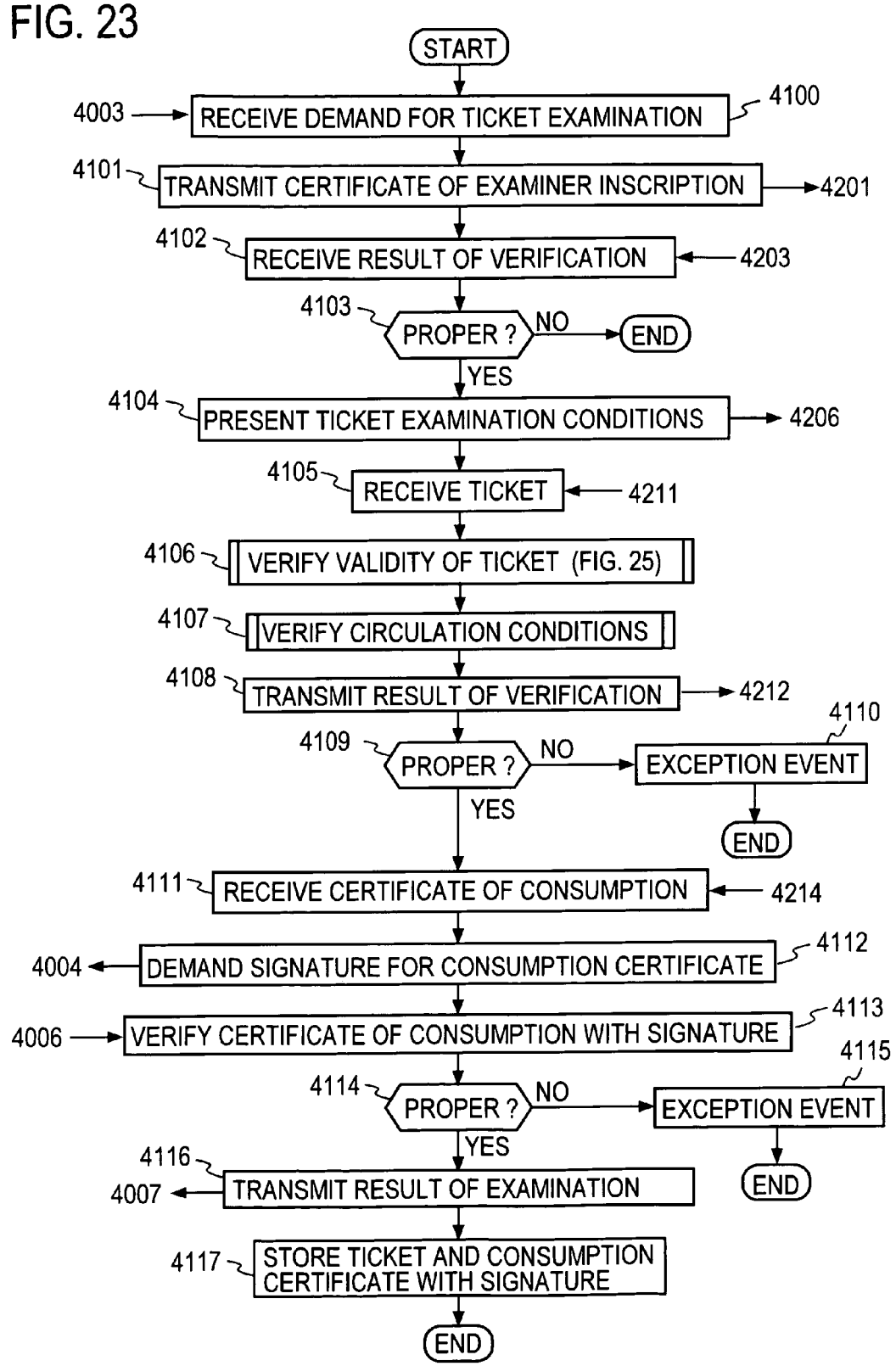
FIG. 23 is a flow chart of an electronic ticket processor associated with a ticket examiner unit upon consumption.

FIG. 23 shows a flow executed by the electronic ticket processor 501 of the ticket examiner units 500 during the consumption.

Step 4100: A demand for the ticket examination (step 4003 in FIG. 22) is received from the ticket examining controller 502 to begin the treatment.

Step 4101: The certificate of ticket examiner inscription of the ticket examiner unit is transmitted to the account unit 210 of the user which is already connected in order to have the identity of the ticket examiner confirmed by the account unit 210 of the user.

Step 4102: A result of verification is received from the account unit 210 of the user.

Step 4103: A decision is rendered upon the result of verification, and if the result of verification indicates that it is not proper, the treatment is terminated.

Step 4104: If the result of verification indicates that it is proper, the ticket examining condition is presented to the account unit 210.

Step 4105: The ticket body being examined which complies with the condition is transmitted from the account unit 210, and thus is received.

Step 4106: The validity of the received ticket is verified.

Step 4107: The consuming circulation condition (indicating whether or not this user is entitled to use) which is described on the electronic ticket body is verified.

Step 4108: A result of verification is communicated to the account unit 210.

Step 4109: A decision is rendered upon the result of verification.

Step 4110: If the circulation condition is not complied with, an exception event is raised, and the treatment is terminated.

Step 4111: A certificate of consumption is received from the account unit 210.

Step 4112: The certificate of consumption is transmitted to the ticket examining controller 502, demanding a signature thereto.

Step 4113: The certificate of consumption with signature is received from the ticket examining controller 502, and its validity is verified.

Step 4114: A decision is rendered upon the result of verification.

Step 4115: If the result of verification indicates that it is not proper, an exception event is raised, and the treatment is terminated.

Step 4116: If the result of verification indicates that it is proper, a result of examining the ticket is transmitted to a service offering arrangement, such as an entrance gate unit or a shop-front POS terminal, for example.

Step 4117: The electronic ticket and the certificate of consumption with signature are saved.

In rendering a decision during the examination of the ticket, it is possible to register the ticket ID of a used electronic ticket with a database to detect any electronic ticket which undergoes a double use, thus preventing such double use. It is also possible to use Distributed Digital Ticket Management for Rights Trading System (an original text managing system described in ACM Conference on Electronic Commerce, 1999, pp 110–118 and referred to as a token manager) may be used in combination to prevent the double use. If these measures are not taken, a series of certificates of transfer of a used electronic ticket may be analyzed to identify a person who has committed a multiple transfer or a multiple use, thereby taking an ex post facto measure as by punishing him.

Figure 24:
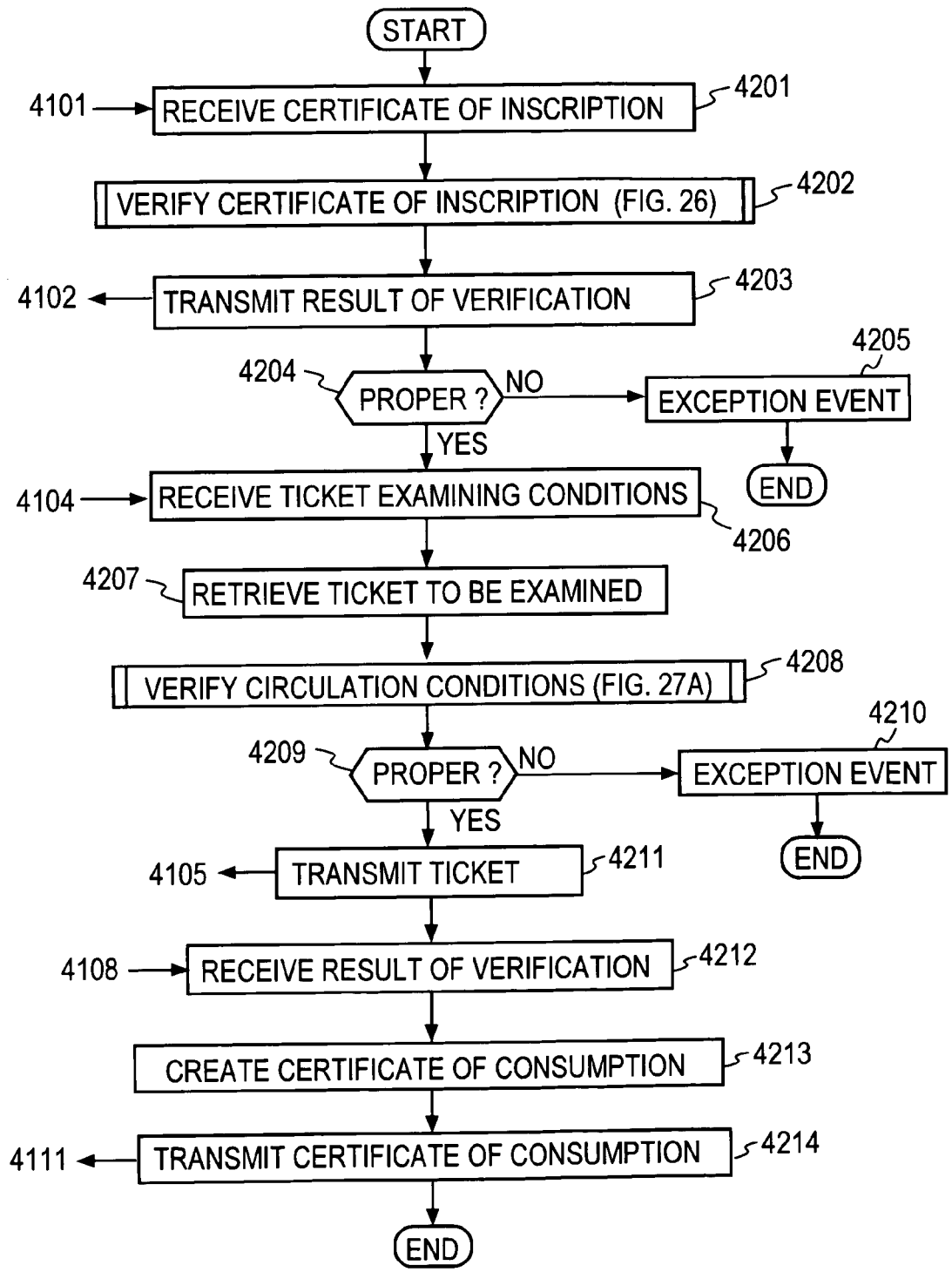
FIG. 24 is a chart showing a main flow in an electronic ticket processor of a consumer account unit upon consumption.

FIG. 24 shows a main flow of the electronic ticket processor of the account unit of the consumer (user) side during the consumption.

Step 4201: Upon initiating the treatment, a certificate of inscription for the ticket examiner unit is transmitted, and thus is received.

Step 4202: The certificate of inscription is verified and also the identity is verified.

Step 4203: A result of verification is transmitted.

Step 4204: A decision is rendered upon the result of verification.

Step 4205: If anything wrong is found, an exception event is raised and the treatment is terminated.

Step 4206: The ticket examining condition is transmitted from the ticket examiner unit, and thus is received.

Step 4207: A ticket which complies with the ticket examining condition is retrieved.

Step 4208: The circulation condition on the packet examining side which is described on the ticket (indicating if the ticket examiner unit is entitled to accept the ticket) is verified.

Step 4209: A decision is rendered upon the result of verification.

Step 4210: If the circulation condition is not complied with, an exception event is raised and the treatment is terminated.

Step 4211: If the circulation condition is complied with, the ticket body is transmitted to the ticket examiner unit.

Step 4212: A result of verifying the circulation condition on the ticket examining side is received.

Step 4213: A certificate of consumption is prepared.

Step 4214: The certificate of consumption is transmitted to the ticket examiner unit, thus proving that the ticket has been consumed.

Routine Flows

Various routines in each of the flows mentioned above are described below.

Figure 25:
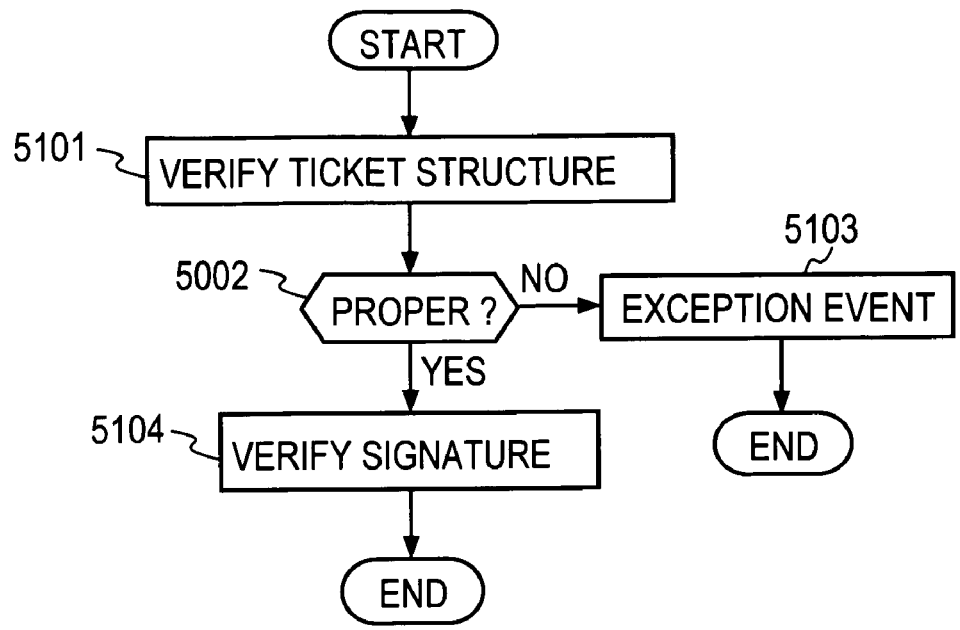
FIG. 25 is a flow chart of the verification of the validity of a ticket.

FIG. 25 shows a flow for verifying the validity of an electronic ticket.

Step 5101: The structure of a ticket is initially verified.

Step 5102: A decision is rendered upon the result of verification.

Step 5103: If the result of verification indicates that the ticket is not proper, an exception event is raised and the treatment is terminated.

Step 5104: If the ticket is proper, then follows a verification of the signature using an public key obtained from the flow of FIG. 26 which will be described later, whereupon the treatment is terminated. However, it is assumed that a key required to verify the signature on the certificate of inscription is already in possession.

Figure 26:
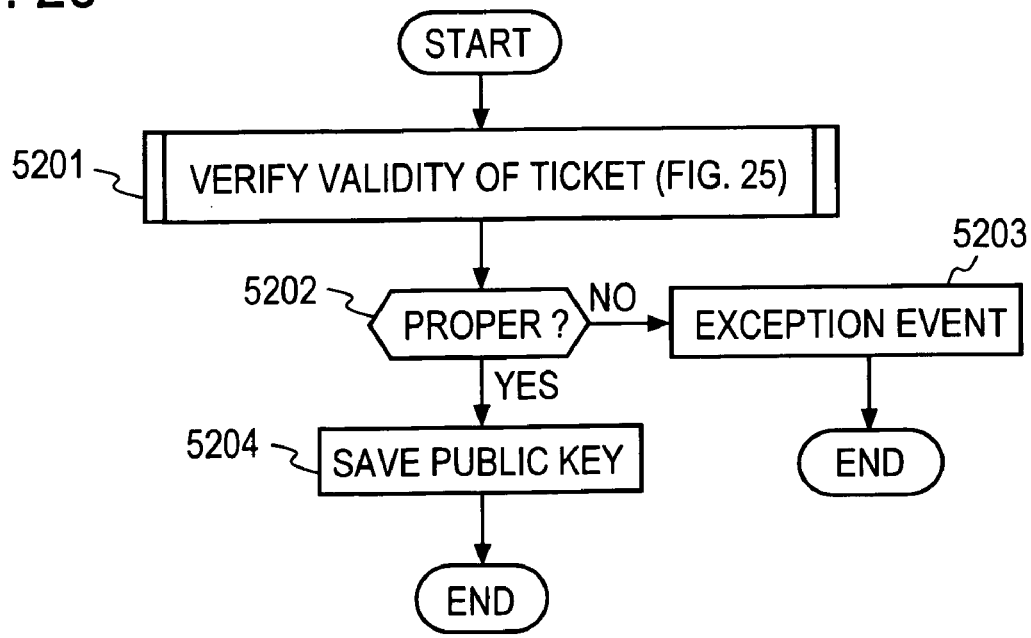
FIG. 26 is a flow chart of the verification of a certificate of inscription.

FIG. 26 shows a flow of verifying a certificate of inscription such as a certificate of user inscription shown in FIG. 9 or a certificate of examiner inscription shown in FIG. 10.

Step 5201: The validity of a certificate of inscription is verified, as an electronic ticket, according to the flow of FIG. 25.

Step 5202: A decision is rendered upon the result of verification.

Step 5203: If the result of verification is failing, an exception event is raised and the treatment is terminated.

Step 5204: If the result of verification indicates the proper certificate, the public key stated on the certificate of inscription is saved as the public key for the user ID.

Figure 27A:
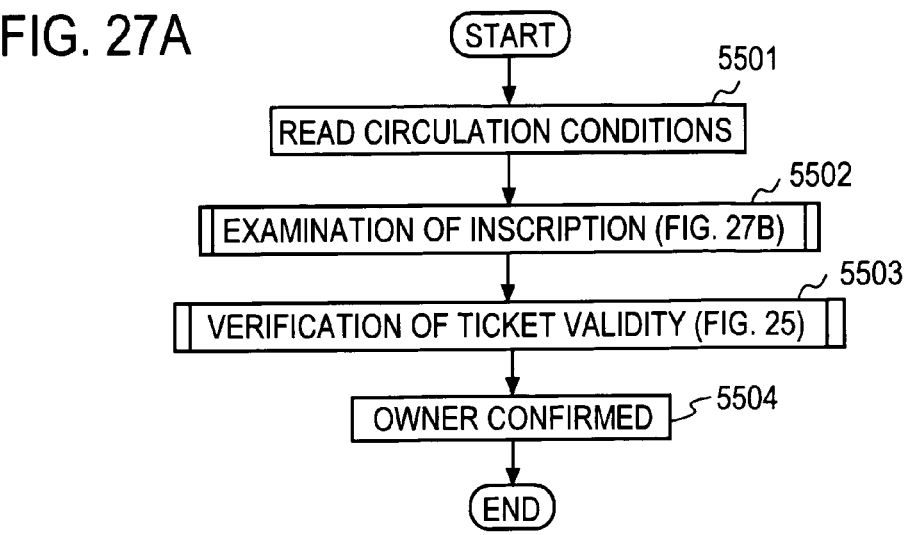
FIG. 27A is a flow chart of the verification of circulation condition.

FIG. 27A shows a flow of verifying a circulation condition. This processing is implemented, for example, in step 2307 of FIG. 15, step 2504 of FIG. 17, step 3207 of FIG. 20, step 3304 of FIG. 21, step 4107 of FIG. 23 and step 4208 of FIG. 24, where it is examined if the side who is to receive an electronic ticket is qualified to receive or if the side who is to transmit an electronic ticket is qualified to transmit.

Step 5501: A circulation condition which is described on an electronic ticket is read out.

Step 5502: The ticket on which the condition is described is examined in accordance with the processing flow of FIG. 27B.

Step 5503: The validity of the acquired certificate of inscription is verified, as an electronic ticket, according to the flow of FIG. 25.

Step 5504: A verification is made to see if the owner ID on the acquired certificate of inscription coincides with the owner ID of the electronic ticket.

Figure 27B:
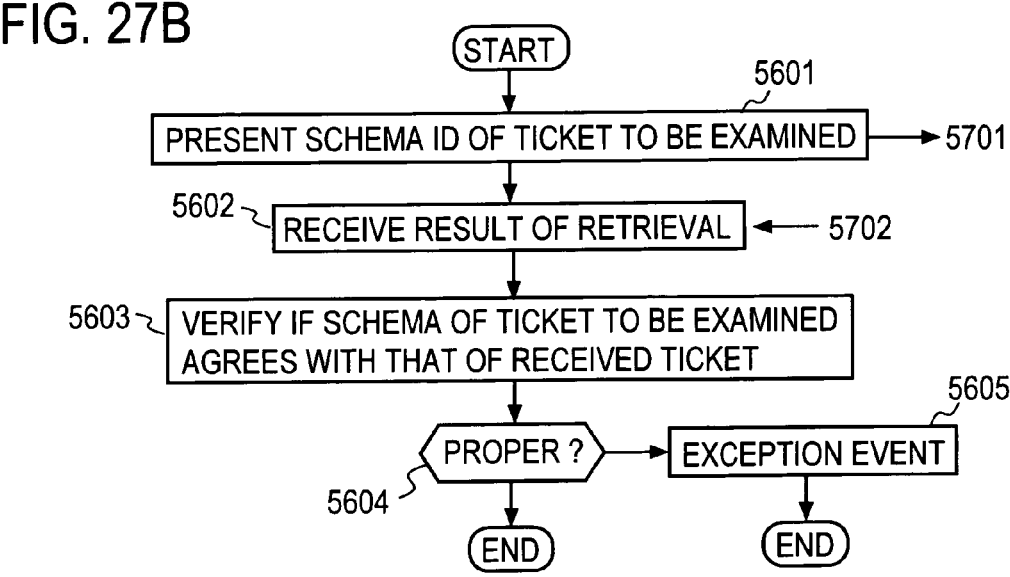
FIG. 27B is a flow chart of the verification of circulation condition on the examiner side.

FIG. 27B shows a flow of the certificate of inscription examination on the examiner side at step 5502 of FIG. 27A.

Step 5601: The schema ID of the certificate of inscription to be examined as an electronic ticket is presented to the side being examined.

Step 5602: The examiner side receives a result of retrieval from the side being examined.

Step 5603: If a certificate of inscription has been received, it is checked if the schema ID of the certificate of inscription to be examined as an electronic ticket agrees with that of the certificate of inscription received.

Step 5604: Decide the result of check and if the result is proper, the processing is then completed.

Step 5605: If the result of check is not proper, an exception event is raised and the processing is terminated.

Figure 28:
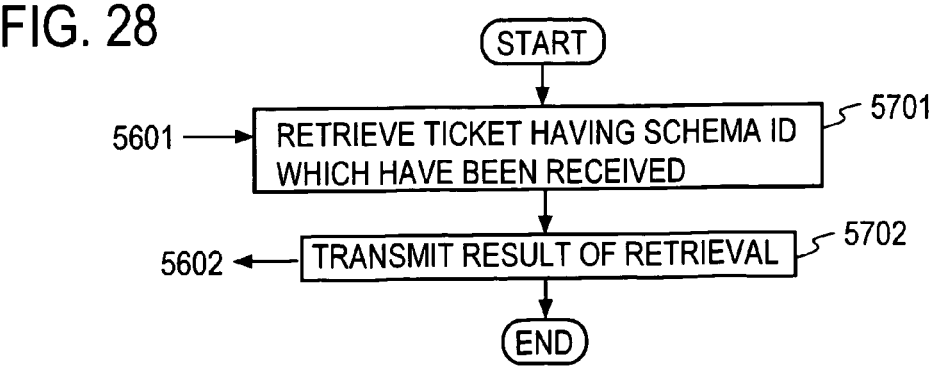
FIG. 28 is a flow chart of the verification of circulation condition on the side being examined.

FIG. 28 shows a flow of the certificate of inscription examination on the side being examined in response to demand for certificate of inscription in the processing on the examiner side shown in FIG. 27B.

Step 5701: The side being examined retrieves a certificate of inscription which meets the schema ID received from the examiner side.

Step 5702: As a result of a retrieval, if it is found that there exists a certificate of inscription which meets the schema ID, the certificate of inscription is transmitted to the examiner side, and if such certificate of inscription does not exist, a reply to this effect is transmitted to the examiner side.

Modification

In the described embodiment, an electronic ticket is stowed in an account unit on a network. However, an electronic ticket stowed in an equivalent account unit may be downloaded into a portable account unit, and the account unit in which the electronic ticket is stowed may be physically carried by a user together with a portable processor, whereby the ticket examination may be performed in exactly the same manner as in the present embodiment for an off-line ticket examiner unit which is not provided with an equipment for connection with an account unit on the network, by allowing the portable account unit to be connected when the ticket examination is to be made. In this instance, the account unit and the portable processor may be located within one physical unit.

In the described embodiment, a certificate of account address and a certificate of user inscription are separate from each other. However, the certificate of account address may function as a certificate of user inscription by containing a description of an public key which is necessary to verify the signature on the certificate of transfer or consumption with signature, thus allowing the examination of the certificate of user inscription to be omitted. Conversely, the certificate of user inscription may function as the certificate of account address and may contain a description that it retains a certificate of a particular account address as a circulation condition for the electronic ticket which is to be circulated, thus allowing the verification of the circulation condition to be achieved through the verification of the certificate of account address.

In the described embodiment, when the ticket examination is to be performed, the portable processor 400 is inserted into the ticket examiner units 500 for a mechanical and an electrical connection therewith. However, the portable processor 400 may be adapted to achieve a connection with the communication network (internet 10), and thus be allowed to be connected with the ticket examiner units 500 through the communication network for performing a consumption treatment for the electronic ticket. Alternatively, the portable processor 400 may be inserted into the user terminal unit 300 to be connected with the ticket examiner units 500 through the communication network, which is enabled by the user terminal unit 300, thus performing a ticket examining treatment (consumption treatment) for the electronic ticket.

In the embodiment described above, the certificate of consumption for the electronic ticket is prepared (at step 4213 in FIG. 24) by the user account unit 210 during the consumption treatment. However, the certificate of consumption may be prepared by the ticket examiner units 500. Alternatively, where the portable processor 400 is inserted into the user terminal unit 300 and then connected through the communication network with the ticket examiner unit for purpose of consumption treatment, it may be prepared by the user terminal unit.

EFFECT OF THE INVENTION

According to the present invention, each user saves an electronic ticket in a storage provided in an account unit in an account managing center, which is independent from an electronic ticket issuing organization (issuer), and accesses the account unit to derive a required electronic ticket when the electronic ticket is to be used (to be transferred or consumed). Accordingly, there is no need for a portable processor which is used by the user to retain an electronic ticket, thus allowing a variety of electronic tickets from different issuing organizations to be saved in large quantities and to be used.

In principle, each account address is accessible by any user, whereby an electronic ticket can be unilaterally transferred or issued to the account address of any transferee at any time.

Each ticket examiner unit can access an account unit on the network and thus the user is not required to store the electronic ticket body in his portable processor, but can access his account unit through the ticket examiner unit where the user has moved, thus consuming the electronic ticket.

The account unit is not associated with the key, but the portable processor has the signature function so that when transferring and consuming, a signature is attached to the certificate of transfer or consumption by way of the portable processor. Accordingly, if one has successively impersonated himself as a transferee to obtain an electronic ticket, he cannot attach a genuine signature to the certificate of transfer or consumption, and thus is prevented from using the electronic ticket which is illicitly obtained.

What is claimed is:

1. A method of processing consumption of an electronic ticket in an information processing system in which user terminal units, account units each having an account address assigned to each user and storing electronic tickets owned by the assigned user, and ticket examiner units are interconnected by a communication network through which electronic tickets can be circulated, comprising the steps of:

(a) causing a user portable processor owned by a user who wants one of electronic tickets stored in the account unit assigned to said user to be consumed to transmit a demand consumption of said one electronic ticket together with the account address assigned to said user which is derived from the user portable processor to a ticket examiner unit;

b) causing the ticket examiner unit to access the account unit corresponding to the account address derived from the user portable processor by transmitting a certificate of inscription for said ticket examiner unit to demand consumption of the electronic ticket;

(c) causing the account unit to verify the certificate of inscription for the ticket examiner unit;

(d) causing the account unit to derive the demanded electronic ticket and prepare a certificate of consumption and to transmit the electronic ticket and the certificate of consumption to the ticket examiner unit upon successful verification of the certificate of ticket examiner inspection of said ticket examiner unit;

e) causing the ticket examiner unit to request the user portable processor to generate an electronic signature to the certificate of consumption; and f) causing the portable processor to generate the signature to the certificate of consumption and to transmit the certificate of consumption with signature to the ticket examiner unit for verification prior to completion of ticket examination.

2. A method according to claim 1, in which the step d) further comprises the steps of: causing the account unit to verify a circulation condition required on a ticket examining side with which the ticket examiner unit is required to satisfy and which is described on the derived electronic ticket; and to transmit the electronic ticket to the ticket examiner unit upon successful verification of the circulation condition.

3. A method according to claim 1, in which step d) further comprises the steps of: causing the ticket examiner unit to verify a circulation condition required on a user side with which the user is required to satisfy and which is described on the received electronic ticket, and using a result of such verification as a condition for deciding whether the electronic ticket should pass ticket examination or not.

* * * * *